(12) United States Patent
Safary

(10) Patent No.: US 11,989,276 B2
(45) Date of Patent: May 21, 2024

(54) INTELLIGENT AUTHENTICATION OF USERS IN METAVERSE LEVERAGING NON-FUNGIBLE TOKENS AND BEHAVIOR ANALYSIS

(71) Applicant: BANK OF AMERICA CORPORATION, Charlotte, NC (US)

(72) Inventor: Jigesh Rajendra Safary, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 217 days.

(21) Appl. No.: 17/848,762

(22) Filed: Jun. 24, 2022

(65) Prior Publication Data

US 2023/0418921 A1 Dec. 28, 2023

(51) Int. Cl.
*H04L 12/28* (2006.01)
*G06F 21/31* (2013.01)
*G06F 21/33* (2013.01)
*G06Q 20/40* (2012.01)
*H04L 9/32* (2006.01)

(52) U.S. Cl.
CPC ............ *G06F 21/33* (2013.01); *G06F 21/316* (2013.01); *G06Q 20/401* (2013.01); *G06Q 2220/00* (2013.01)

(58) Field of Classification Search
CPC ...... G06F 21/33; G06F 21/316; G06Q 20/401
USPC .......................................................... 726/20
See application file for complete search history.

(56) References Cited

U.S. PATENT DOCUMENTS

| | | |
|---|---|---|
| 8,245,283 B2 | 8/2012 | Dawson et al. |
| 10,484,178 B2 | 11/2019 | Andrade |
| 10,542,046 B2 | 1/2020 | Katragadda et al. |
| 11,282,139 B1 | 3/2022 | Winklevoss et al. |
| 11,308,484 B2 | 4/2022 | Smirnov |
| 11,334,875 B2 | 5/2022 | Yantis et al. |
| 11,341,818 B2 | 5/2022 | Pustizzi |
| 11,488,176 B2 | 11/2022 | Padmanabhan et al. |
| 11,526,614 B2 | 12/2022 | Fang |
| 11,727,504 B2 | 8/2023 | Cella |
| 2022/0012731 A1 | 1/2022 | Derosa-Grund |
| 2022/0294630 A1 | 9/2022 | Collen |
| 2022/0366494 A1* | 11/2022 | Cella .................... H04L 9/50 |
| 2023/0063245 A1* | 3/2023 | Young .................. H04L 9/3247 |

(Continued)

*Primary Examiner* — Haresh N Patel
(74) *Attorney, Agent, or Firm* — Moore & Van Allen PLLC; James C. Edwards

(57) ABSTRACT

Security measures are provided for resource exchange events occurring within a virtual environment, such as metaverse or the like. Intelligent resource exchange event authentication is realized by leveraging Artificial Intelligence (AI) and, more specifically, Machine Learning (ML) techniques to identify user behavioral patterns associated with previous resource exchange events conducted within the virtual environment and, in some instances, non-virtual environment. Current resource exchange event characteristics are compared to the user behavior patterns to ensure that the resource exchange event is authentic/legitimate. Additionally, intelligent user authentication occurs by leveraging the use of a Non-Fungible Token (NFT) that is presented by the user at the onset of the resource exchange event and is verified within a distributed trust computing network.

20 Claims, 9 Drawing Sheets

(56) References Cited

U.S. PATENT DOCUMENTS

| | | | |
|---|---|---|---|
| 2023/0119691 A1* | 4/2023 | Kurian | G06F 9/5027 |
| | | | 713/164 |
| 2023/0135473 A1* | 5/2023 | Abiodun | G06Q 50/01 |
| | | | 726/28 |
| 2023/0177628 A1* | 6/2023 | Kim | G06Q 50/184 |
| | | | 705/310 |
| 2023/0162168 A1* | 8/2023 | Kim | G06Q 20/1235 |
| | | | 705/26.1 |
| 2023/0252018 A1* | 8/2023 | Sharma | G06Q 10/06 |
| | | | 707/703 |
| 2023/0267450 A1* | 8/2023 | Bathen | G06Q 20/389 |
| | | | 705/66 |
| 2023/0269085 A1* | 8/2023 | Schreck | H04L 9/0894 |
| | | | 713/168 |
| 2023/0269086 A1* | 8/2023 | Schreck | H04L 9/0894 |
| | | | 713/168 |
| 2023/0269091 A1* | 8/2023 | Schreck | H04L 9/0894 |
| | | | 713/168 |
| 2023/0297984 A1* | 9/2023 | Knock | G06Q 20/3678 |
| | | | 705/59 |
| 2023/0305884 A1* | 9/2023 | Dimitrov | G06F 9/5077 |
| 2023/0306128 A1* | 9/2023 | Schreck | G06F 21/6227 |
| 2023/0316280 A1* | 10/2023 | Sardari | G06Q 20/4015 |
| | | | 705/64 |
| 2023/0336468 A1* | 10/2023 | Christa | H04L 45/42 |

\* cited by examiner

INTELLIGENT AUTHENTICATION OF USERS IN METAVERSE LEVERAGING NON-FUNGIBLE TOKENS AND BEHAVIOR ANALYSIS

FIELD OF THE INVENTION

The present invention is generally directed to computer security and, more specifically, intelligently authenticating the identity of users in a virtual resource exchange event by leveraging Non Fungible Tokens and the legitimacy of the resource exchange event by leveraging user Machine Learning (ML)-based behavior analysis.

BACKGROUND

Metaverse is a hypothetical iteration of the Internet as a single, universal and immersive virtual environment that is facilitated by the use of virtual reality and augmented reality headsets. Thus, Metaverse provides the ability for a user to associate with an avatar (i.e., a virtual representation/object of the user) and for the avatar to conduct resource exchange events within a virtual environment. While the resource exchange event is initiated entirely within the virtual environment, it results in an actual exchange of resources between the user and the resource providing entity.

Such virtual environment-based resource exchange events pose security threats to ensure that (i) the user is who they purport to be, (ii) the avatar/virtual object is, in fact, associated with the user and (iii) the resource exchange event is legitimate (i.e., being conducted by the user and not by a wrongdoer). Since the resource exchange event is occurring in a virtual environment, the measures that need to be taken to address such security threats may be different than those taken to address non-virtual (e.g., physical or online) resource exchange events.

Therefore, a need exists to develop systems, methods, computer program products and the like which provide security to resource exchange events that occur in a virtual environment, such as Metaverse or the like. In this regard, the desired systems, methods and the like should not only verify/authentic the user and the avatar/virtual object but should also verify/authentic the legitimacy of the resource exchange event itself to ensure that the event is being conducted by the actual verified user as opposed to a wrongdoer acting as the user.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for intelligent authentication/verification for resource exchange events that occur in a virtual environment, such as Metaverse or the like. In addition, to providing for user authentication, the present invention verifies the authenticity/legitimacy of the resource exchange event itself. In this regard, Machine Learning (ML) techniques are implemented to identify user behavior patterns based, at least, on the user's previously conducted virtual environment resource exchange events and, in some embodiments, the user's previously conducted non-virtual (i.e., physical or online) resource exchange events. In response to the user initiating a resource exchange event in the virtual environment, characteristics or the current resource exchange event are compared with the identified user behavior patterns to ensure that the current resource exchange event is consistent with the user's behavior patterns. Such a comparison, verifies that the authenticity/legitimacy of the resource exchange event (i.e., verifies that the resource exchange event is being conducted by the user and not a wrongdoer).

In addition, embodiments of the invention, provide for authentication of the user through user presentation of a Non-Fungible Token (NFT) that is verified through a consensus of decentralized nodes forming a distributed trust computing network (commonly referred to as a "blockchain" network). In further specific embodiments of the invention, the virtual object (i.e., avatar) is verified as being associated with the user based on presentation of a previously generated token or the like that is based on the object identifier.

Thus, embodiments of the present invention provide a heightened level of security for resource exchange events that occur in virtual environments, such as Metaverse or the like. In this regard, the present invention not only intelligently verifies the identity of the user but also verifies the legitimacy of the resource event transaction itself.

A system for authenticating a user and a virtual resource exchange event defines first embodiments of the invention. The system includes a distributed trust computing network including a plurality of decentralized nodes. Each decentralized node has a first memory and one or more first processing devices in communication with the first memory. The first memory of the decentralized nodes is configured to store one or more distributed ledgers. Each distributed ledger including a plurality of data blocks. In response to a virtual object (e.g., avatar or the like) associated with the user initiating the virtual resource exchange event, a Non-Fungible Token (NFT) associated with the user is received by the distributed trust computing network and a plurality of the decentralized nodes are configured to validate the NFT (the validation of the NFT serves to authenticate the user). In response to validating the NFT, a data block associated with virtual resource exchange event is stored within one of the one or more distributed ledgers.

The system additionally includes a first computing platform (e.g., one or more servers or the like) that includes a second memory and one or more second processing devices in communication with the second memory. The second memory stores a virtual resource exchange event authorizer tool that is executable by at least one of the one or more second processing devices. The tool is configured to implement one or more Machine Learning (ML) algorithms to learn one or more first user behavior patterns. Each first user behavior pattern indicating a pattern of behavior of the user in conducting, at least, prior virtual resource exchange events. In response to receiving data/characteristics associated with a virtual resource exchange event being currently initiated by the virtual object, the tool is further configured to implement ML techniques to apply the one or more first user behavior patterns to the data associated with the virtual resource exchange event to determine whether the virtual resource exchange event is authentic. In response to (i) the distributed trust computing network validating the NFT, and (ii) determining that the virtual resource exchange event is authentic, the virtual resource exchange event authorizer tool is configured to authorize processing of the virtual resource exchange event.

In specific embodiments the system further includes a second computing platform having a third memory and one or more third processing devices in communication with the third memory. The third memory stores a token generator tool that is executable by at least one of the one or more third processing devices and is configured to generate a virtual object authentication token that associates the user with a virtual object identifier that identifies the virtual object (e.g., avatar) used by the user. In such embodiments of the system, the virtual resource exchange event authorizer tool is configured to receive or access the virtual object authentication token to authenticate the virtual object and the authorizing processing of the virtual resource exchange event is in further response to (iii) authenticating the virtual object.

In further specific embodiments of the system, the virtual resource exchange event authorizer tool is configured to implement the one or more Machine Learning (ML) algorithms to learn the one or more first user behavior patterns that are based on at least one of (i) one or more metaverses and (ii) one or more virtual resource exchange providers at which the user conducted the prior virtual resource exchange events. In further related embodiments of the system, the one or more first user behavior patterns that are based on at least one of (i) a type of item or service obtained by the user in the prior virtual resource exchange events or (ii) an amount of resources exchanged by the user in the prior virtual resource exchange events. In still further related embodiments of the system, the first user behavior patterns are based on the geographic-location (i.e., actual location) of the user when conducting the prior virtual resource exchange events.

In additional specific embodiments of the system, each first user behavior pattern that is identified by the virtual resource exchange event authorizer tool indicates a pattern of behavior of the user in conducting, at least one of, the prior virtual resource exchange events and prior non-virtual (i.e., physical location or online) resource exchange events. In such embodiments of the system, the first user behavior patterns may be based on at least one of (i) a type of item or service obtained by the user in the prior non-virtual resource exchange events, (ii) an amount of resources exchanged by the user in the prior non-virtual resource exchange events, (iii) a geographic-location of the user when conducting the prior non-virtual resource exchange events, and (iv) one or more physical or online resource exchange providers at which the prior non-virtual resource exchange events occurred.

In still further specific embodiments, the system includes a second computing platform having a third memory and one or more third processing devices in communication with the third memory. The third memory stores a resource exchange event pattern detection tool that is executable by at least one of the one or more third processing devices and is configured to implement one or more Machine Learning (ML) algorithms to learn one or more second user behavior patterns. Each second user behavior pattern indicating a pattern of behavior of the user in conducting prior non-virtual resource exchange events. In such embodiments of the system, the virtual resource exchange event authorizer tool is further configured to implement the one or more Machine Learning (ML) algorithms to apply the one or more first user behavior patterns and the one or more second user behavior patterns to the data associated with the virtual resource exchange event to determine whether the virtual resource exchange event is authentic.

In other specific embodiments of the system, in response to (i) the distributed trust computing network failing to validate the NFT, or (ii) failing to determine that the virtual resource exchange event is authentic, the virtual resource exchange event authorizer tool is further configured to generate and initiate electronic communication of an alert to one or more predetermined entities that notifies the one or more predetermined entities that the virtual resource exchange event has not been authorized for processing. In further related embodiments of the system, the virtual resource exchange event authorizer tool is further configured to generate one or more user behavior reports that indicate the one or more pattern of behaviors of the user in conducting, at least, the prior virtual resource exchange events.

Moreover, in additional specific embodiments of the system, the virtual resource exchange event authorizer tool is further configured to authenticate the virtual resource exchange event in response to the distributed trust computing network validating the NFT.

A computer-implemented method for authenticating a user and a virtual resource exchange event defines second embodiments of the invention. The computer-implemented method is executable by one or more computing processor devices. The method includes, in response to a virtual object associated with a user initiating the virtual resource exchange event, receiving, at a distributed trust network, a Non-Fungible Token (NFT) associated with the user and validating, by a plurality of decentralized nodes of the distributed trust computing network, the NFT (validating the NFT serves to authenticate the user). The computer-implemented method additionally includes, in response to validating the NFT, storing a data block associated with virtual resource exchange event within a distributed ledger of the distributed trust computing network. Further, the computer-implemented method includes implementing one or more Machine Learning (ML) algorithms to learn one or more first user behavior patterns. Each first user behavior pattern indicating a pattern of behavior of the user in conducting, at least, prior virtual resource exchange events. The computer-implemented method additionally includes, in response to receiving data/characteristics associated with the virtual resource exchange event currently being initiated by the virtual object, implementing ML techniques to apply the one or more first user behavior patterns to the data associated with the virtual resource exchange event to determine whether the virtual resource exchange event is authentic, Further, the computer-implemented method includes, in response to (i) the distributed trust computing network validating the NFT, and (ii) determining that the virtual resource exchange event is authentic, authorizing processing of the virtual resource exchange event.

In specific embodiments the computer-implemented method further includes generating a virtual object authentication token that associates the user with a virtual object identifier that identifies the virtual object used by the user, and receiving or accessing the virtual object authentication token to authenticate the virtual object. In such embodiments of the computer-implemented method, authorizing processing of the virtual resource exchange event is in further response to (iii) authenticating the virtual object.

In additional embodiments of the computer-implemented method, the first user behavior patterns are based on at least one of (i) one or more metaverses at which the user conducted the prior virtual resource exchange events, (ii) one or more virtual resource exchange providers at which the user conducted the prior virtual resource exchange events, (iii) a type of item or service obtained by the user in the prior virtual resource exchange events, (iv) an amount of resources exchanged by the user in the prior virtual resource exchange events and (v) geographic-location of the user when conducting the prior virtual resource exchange events.

In further specific embodiments of the computer-implemented method, each first user behavior pattern indicates a pattern of behavior of the user in conducting, at least one of, the prior virtual resource exchange events and prior non-virtual resource exchange events. In alternate specific embodiments the computer-implemented method includes implementing one or more Machine Learning (ML) algorithms to learn one or more second user behavior patterns, each second user behavior pattern indicating a pattern of behavior of the user in conducting prior non-virtual resource exchange events. In such embodiments, implementing the Machine Learning (ML) techniques to apply the one or more first user behavior patterns further comprises implementing the Machine Learning (ML) techniques to apply the one or more first user behavior patterns and the one or more second user behavior patterns to the data associated with the virtual resource exchange event to determine whether the virtual resource exchange event is authentic.

A computer program product including a non-transitory computer-readable medium defines third embodiments of the invention. the computer-readable medium includes a first set of codes for causing a computer to, in response to a virtual object associated with a user initiating the virtual resource exchange event, receive, at a distributed trust network, a Non-Fungible Token (NFT) associated with the user, a second set of codes for causing a computer to validate, by a plurality of decentralized nodes of the distributed trust computing network, the NFT, wherein validating the NFT serves to authenticate the user, and a third set of codes for causing a computer to, in response to validating the NFT, store a data block associated with virtual resource exchange event within a distributed ledger of the distributed trust computing network. In addition, the computer-readable medium includes a fourth set of codes for causing a computer to implement one or more Machine Learning (ML) algorithms to learn one or more first user behavior patterns. Each first user behavior pattern indicating a pattern of behavior of the user in conducting, at least, prior virtual resource exchange events. Further, the computer-readable medium includes a fifth set of codes for causing a computer to, in response to receiving data associated with the virtual resource exchange event being initiated by the virtual object, implement ML techniques to apply the one or more first user behavior patterns to the data associated with the virtual resource exchange event to determine whether the virtual resource exchange event is authentic, and a sixth set of codes for causing a computer to, in response to (i) the distributed trust computing network validating the NFT, and (ii) determining that the virtual resource exchange event is authentic, authorizing processing of the virtual resource exchange event.

In specific embodiments of the computer program product, the computer-readable medium additionally includes a seventh set of codes for causing a computer to generate a virtual object authentication token that associates the user with a virtual object identifier that identifies the virtual object used by the user, and an eight set of codes for causing a computer to receive or access the virtual object authentication token to authenticate the virtual object. In such embodiments of the computer program product, the sixth set of codes is further configured to cause the computer to authorizing processing of the virtual resource exchange event in further response to (iii) authenticating the virtual object.

In other specific embodiments of the computer program product, the first user behavior patterns are based on at least one of (i) one or more metaverses at which the user conducted the prior virtual resource exchange events, (ii) one or more virtual resource exchange providers at which the user conducted the prior virtual resource exchange events, (iii) a type of item or service obtained by the user in the prior virtual resource exchange events, (iv) an amount of resources exchanged by the user in the prior virtual resource exchange events and (v) geographic-location of the user when conducting the prior virtual resource exchange events.

In still further specific embodiments of the computer program product, the fourth set of codes is further configured to cause the computer to implement the one or more ML algorithms to learn one or more first user behavior patterns. Each first user behavior pattern indicating a pattern of behavior of the user in conducting, at least one of, the prior virtual resource exchange events and prior non-virtual resource exchange events (i.e., physical location resource exchange events and online resource exchange events).

Moreover, in additional specific embodiments the computer program product, the computer-readable medium additionally includes a seventh set of codes for causing a computer to implement one or more Machine Learning (ML) algorithms to learn one or more second user behavior patterns. Each second user behavior pattern indicating a pattern of behavior of the user in conducting prior non-virtual resource exchange events. In such embodiments of the computer program product, the fifth set of codes is further configured to cause the computer to implement the Machine Learning (ML) techniques to apply the one or more first user behavior patterns further comprises implementing the Machine Learning (ML) techniques to apply the one or more first user behavior patterns and the one or more second user behavior patterns to the data associated with the virtual resource exchange event to determine whether the virtual resource exchange event is authentic.

Thus, according to embodiments of the invention, which will be discussed in greater detail below, the present invention provides for intelligent authentication/verification for resource exchange events that occur in a virtual environment, such as Metaverse or the like. In addition, to providing for user authentication, the present invention verifies the authenticity/legitimacy of the resource exchange event itself. In this regard, Machine Learning (ML) techniques are implemented to identify user behavior patterns based, at least, on the user's previously conducted virtual environment resource exchange events and, in some embodiments, the user's previously conducted non-virtual (i.e., physical or online) resource exchange events. In response to the user initiating a resource exchange event in the virtual environment, characteristics or the current resource exchange event are compared with the identified user behavior patterns to ensure that the current resource exchange event is consistent with the user's behavior patterns. Such a comparison, verifies that the authenticity/legitimacy of the resource exchange event (i.e., verifies that the resource exchange event is being conducted by the user and not a wrongdoer).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
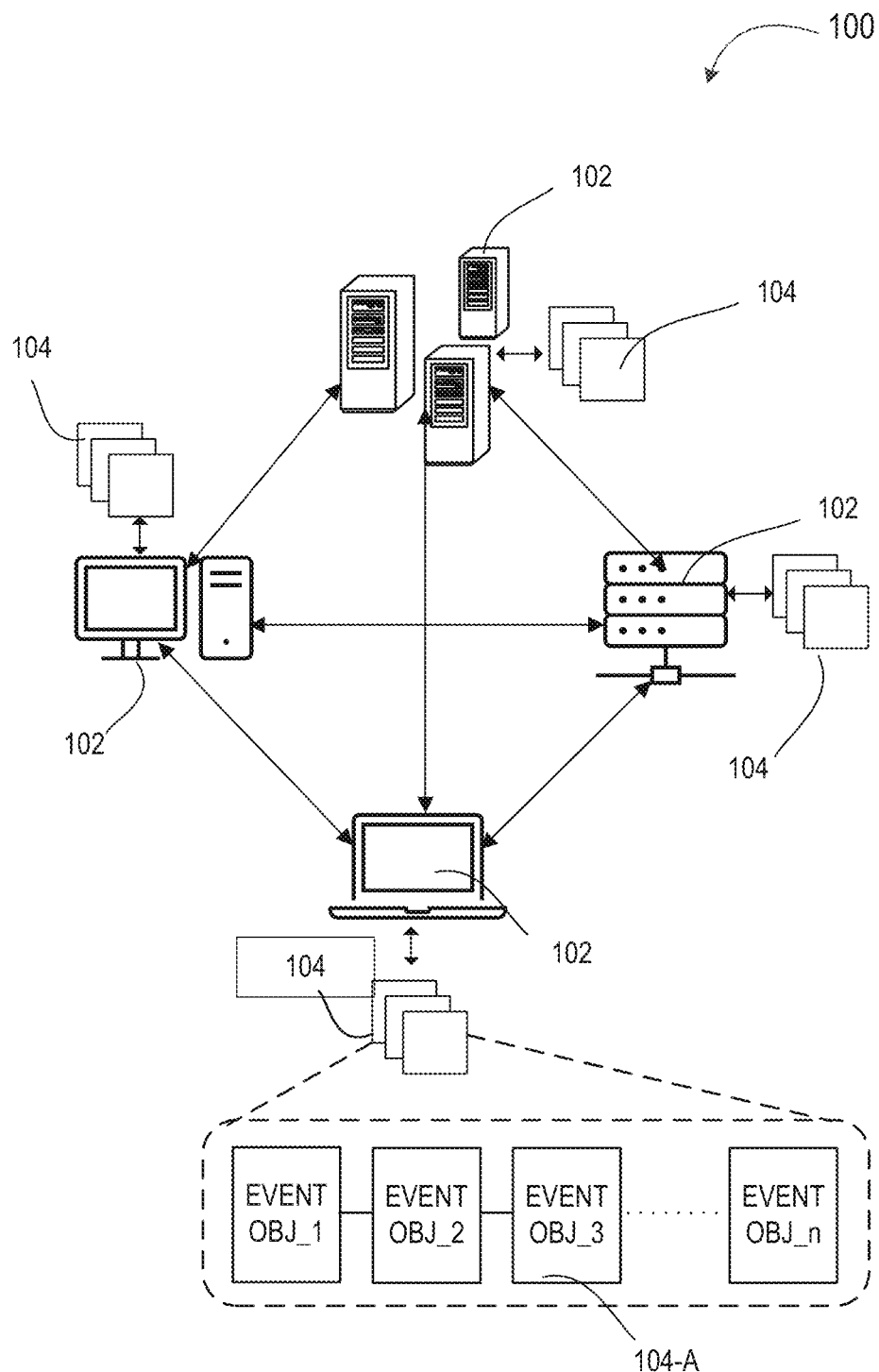
Figure 2:
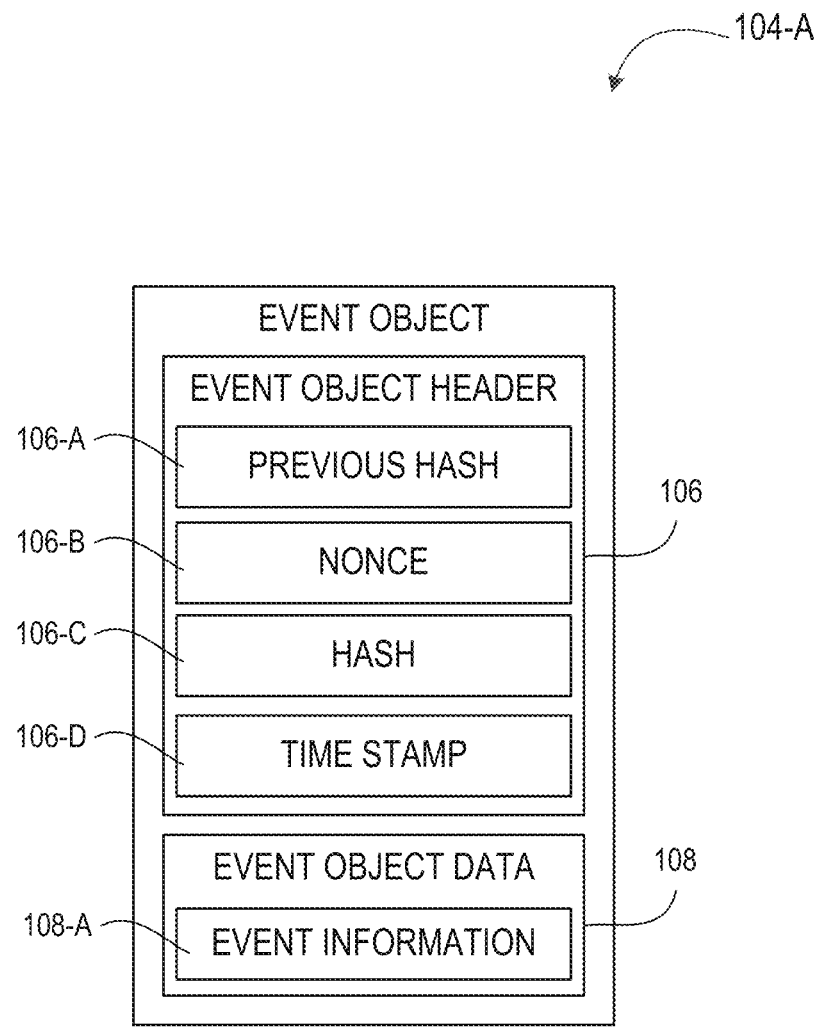
Figure 3:
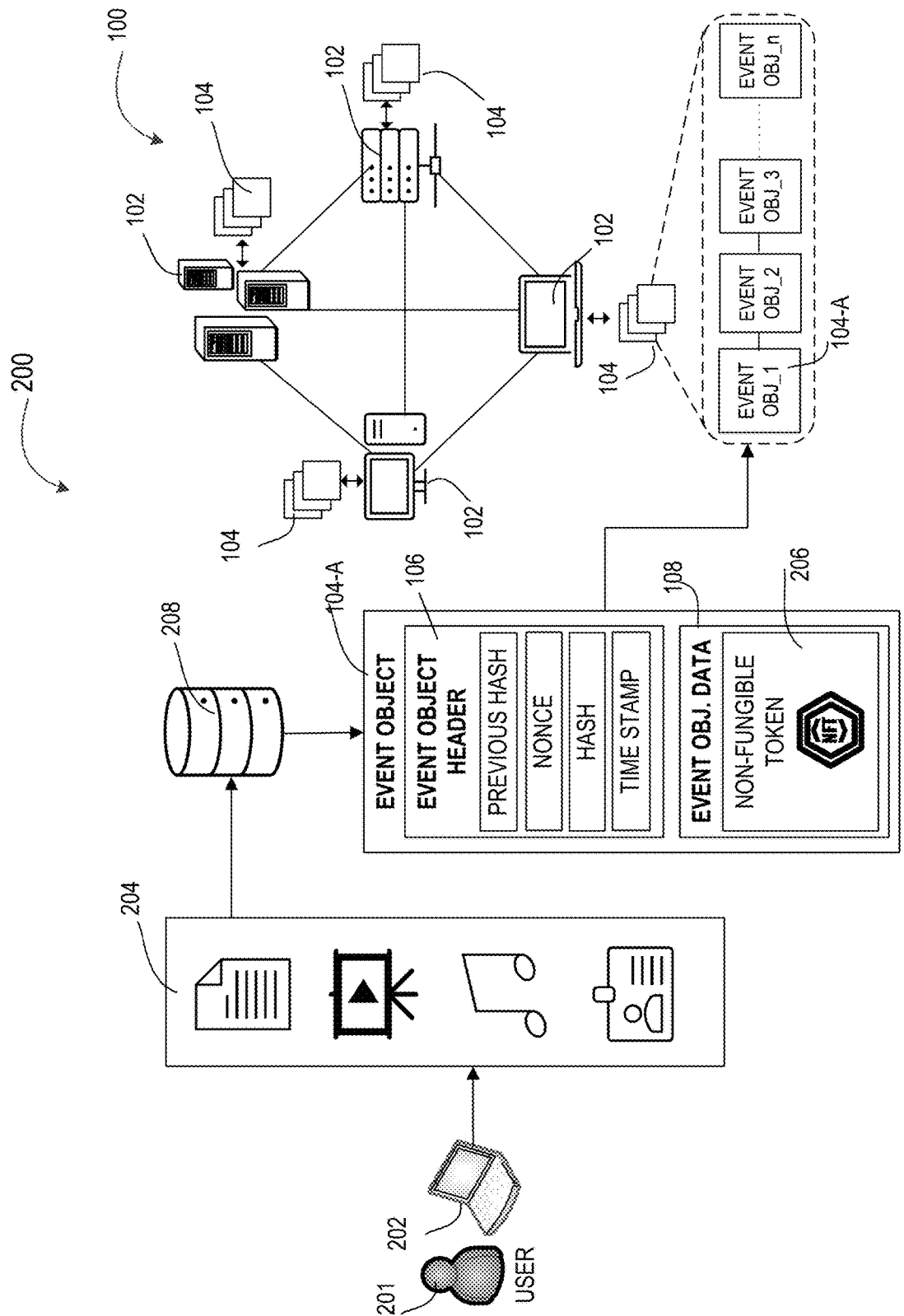
Figure 4:
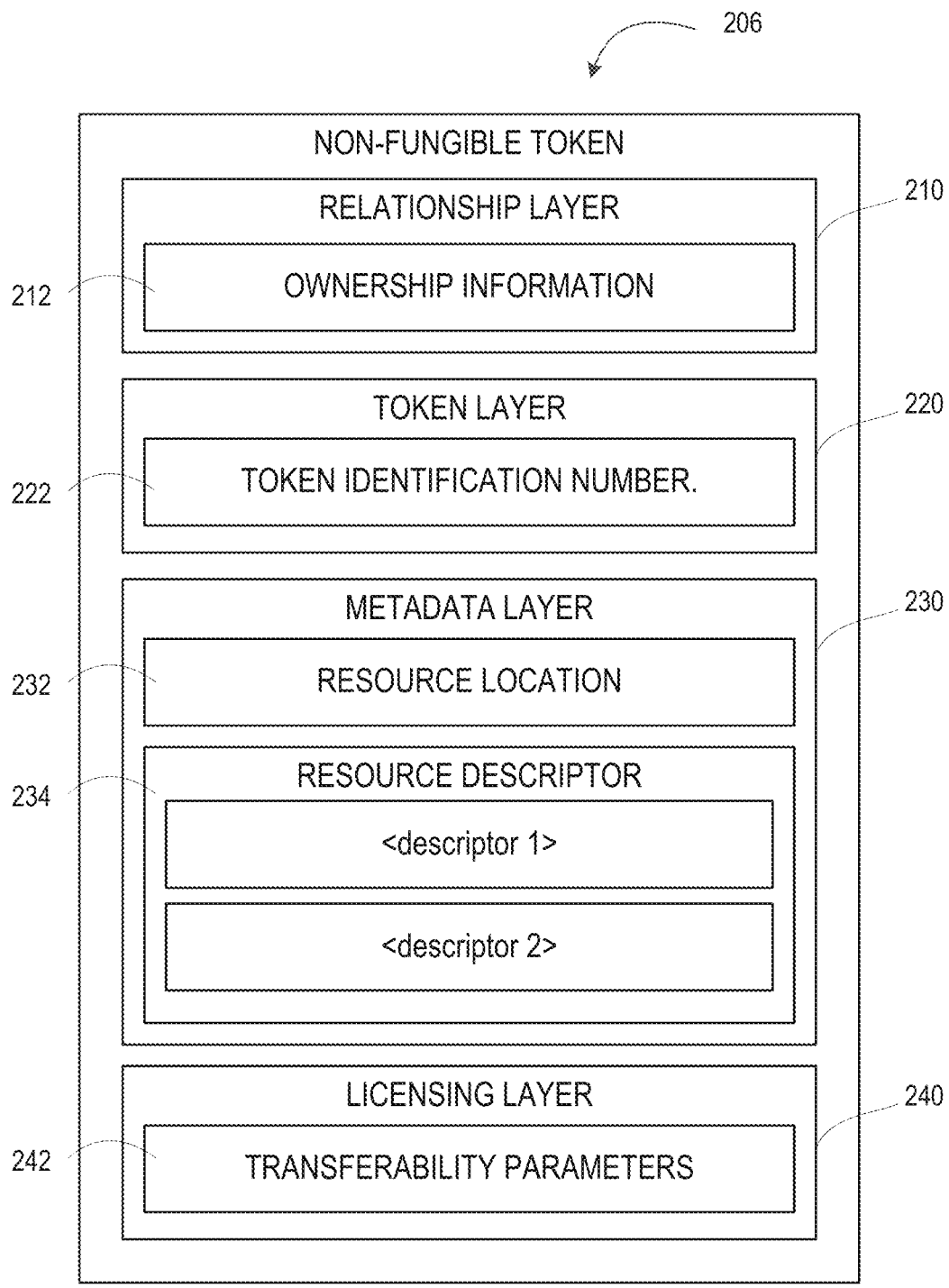
Figure 5:
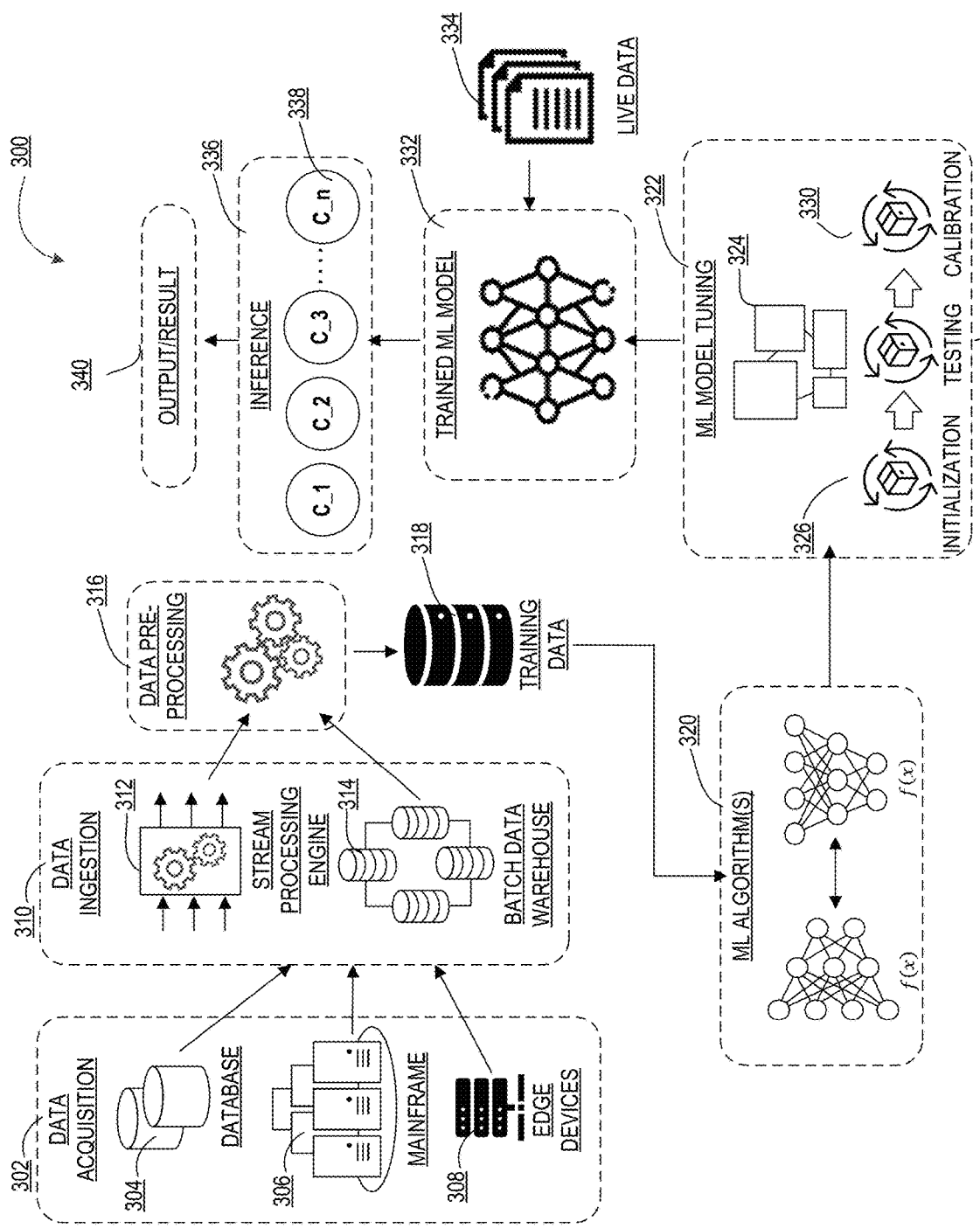
Figure 6:
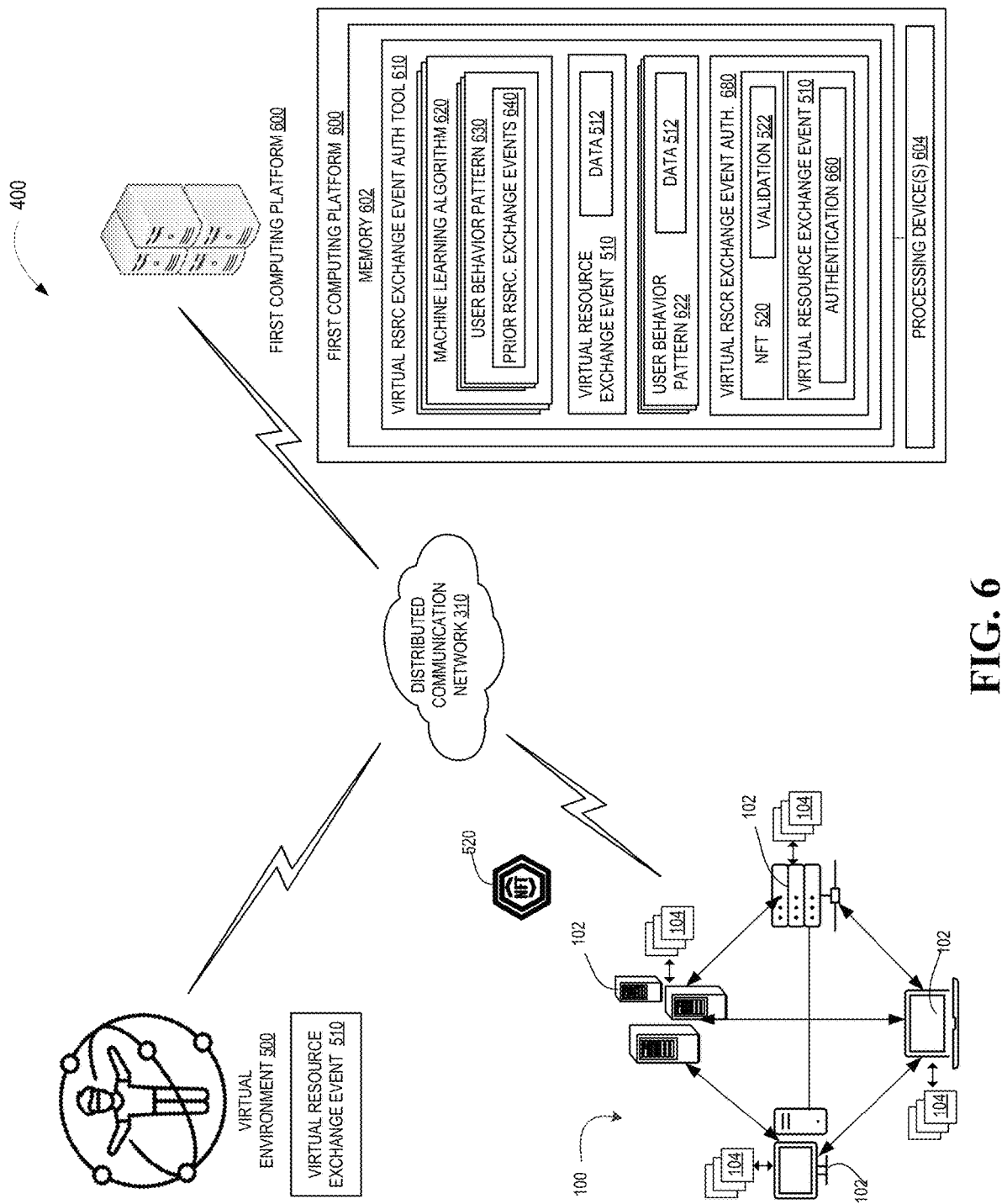
Figure 7:
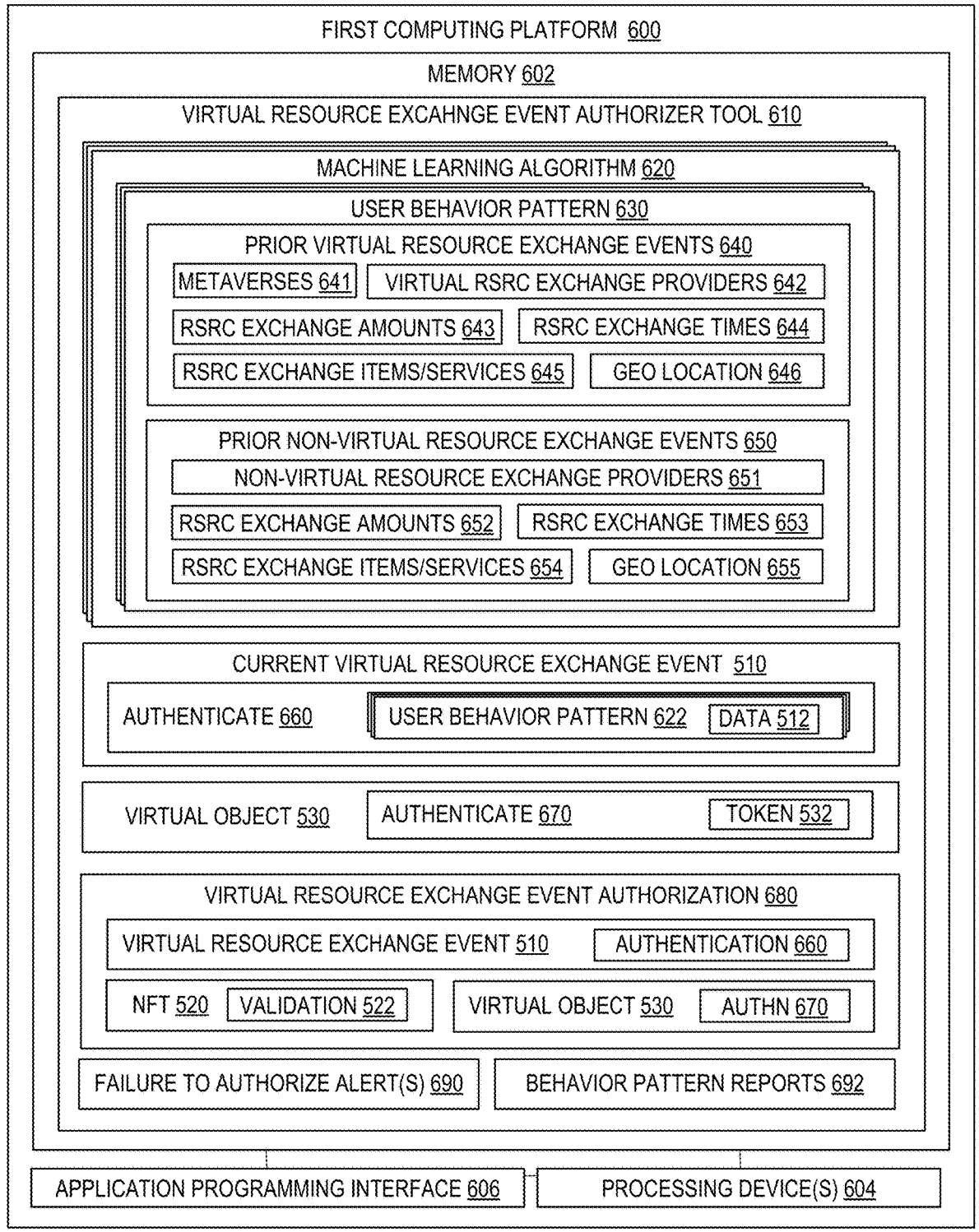
Figure 8:
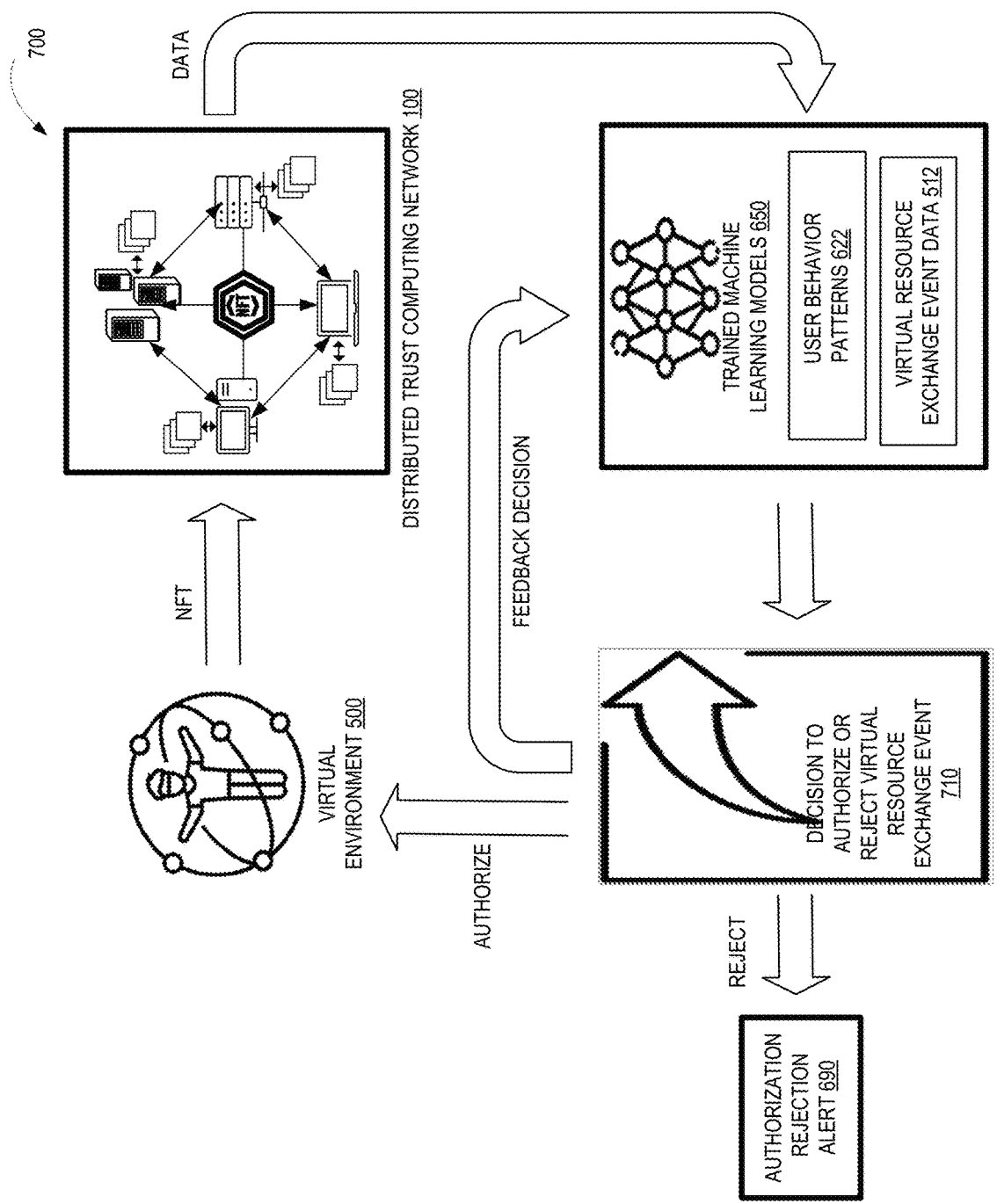
Figure 9:
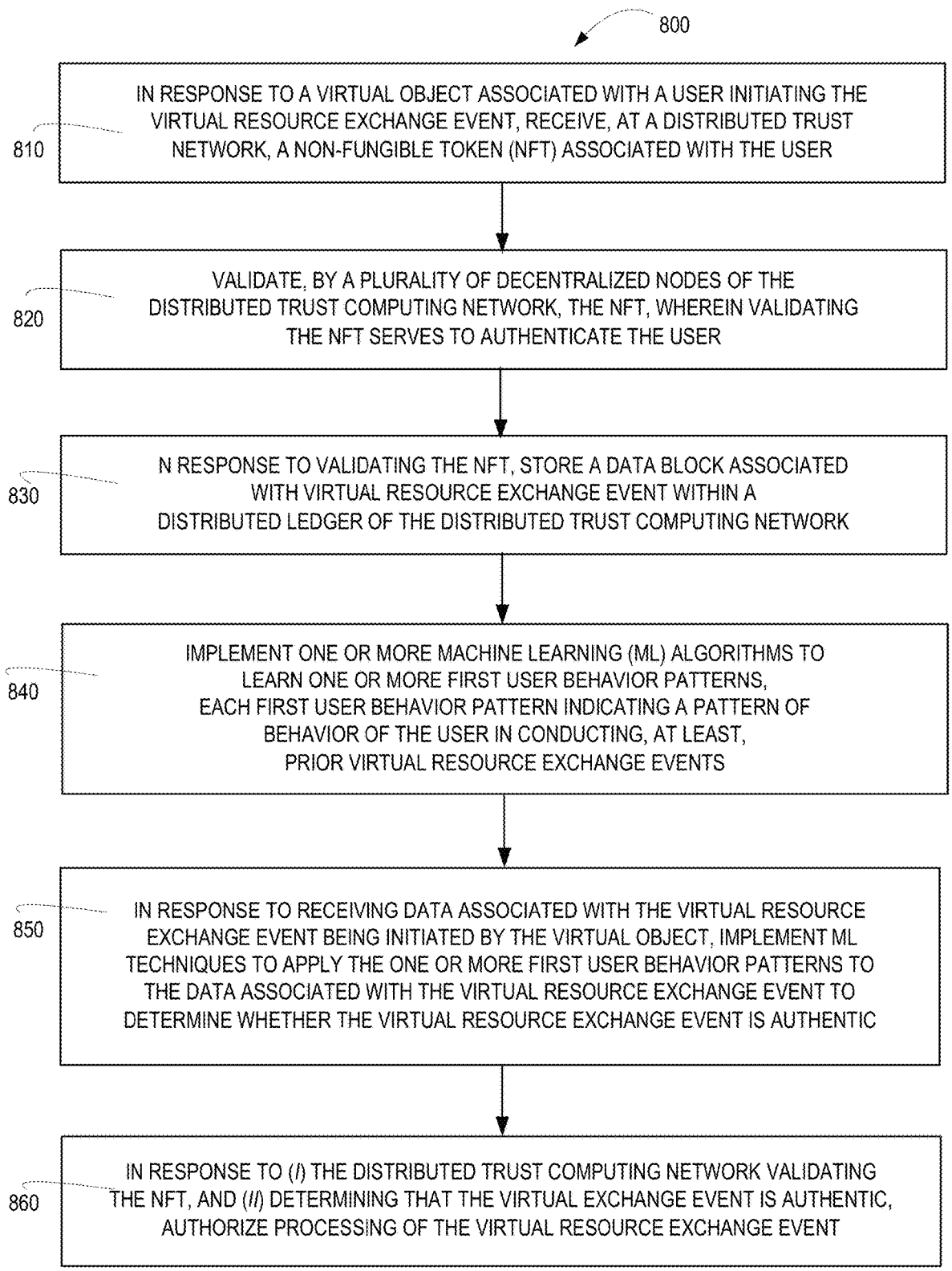

Having thus described embodiments of the disclosure in general terms, reference will now be made to the accompanying drawings, wherein:

FIG. 1 is a schematic diagram of a distributed trust computing network, in accordance with embodiments of the present invention;

FIG. 2 is a block diagram of an event object stored within a distributed ledger of a distributed trust computing network, in accordance with some embodiments of the present disclosure;

FIG. 3 is a schematic diagram of system for generating a Non-Fungible Token (NFT) and storing the NFT within a distributed trust computing network, in accordance with embodiments of the present invention;

FIG. 4 is a block diagram of an architecture for an exemplary NFT; in accordance with embodiments of the present invention;

FIG. 5 is a schematic diagram of a machine learning environment, in accordance with embodiments of the present invention;

FIG. 6 is a schematic/block diagram of a system for authentication/verification of a resource exchange event being conducted in a virtual environment; in accordance with embodiments of the present invention;

FIG. 7 is a block diagram of a computing apparatus including a virtual environment resource exchange event authorizer tool, in accordance with embodiments of the present invention;

FIG. 8 is a schematic/flow diagram of a system/methodology for authentication/verification of a resource exchange event being conducted in a virtual environment; in accordance with embodiments of the present invention; and FIG. 9 is a flow diagram of a computer-implemented method for authentication/verification of a resource exchange event being conducted in a virtual environment; in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

As used herein, "virtual environment" or "metaverse" may refer to a collection of persistent, shared, three-dimensional virtual spaces linked into a perceived virtual universe. In some embodiments, metaverse may not only refer to virtual worlds, but the Internet as a whole, including the spectrum of augmented reality. Metaverse may include a number of different elements such as video conferencing, digital currencies, virtual reality platforms, social media, live data streaming, digital representations of real-life objects and/or the like. In some embodiments, the metaverse may include virtual properties, such as virtual land parcels and estates for users to create and build-on, or structures that reflect real-life properties and/or completely original creations. These spaces may be represented by co-ordinates on the metaverse platform where users can meet up using their avatars (i.e., virtual objects) to socialize and decorate their own spaces with collectibles. Any combination of the aforementioned elements may form a computer-mediated virtual environment, i.e., a virtual world, within the metaverse. Within this self-sustaining, persistent, and shared realm, users may exist and interact with each other using their digital avatars (i.e., virtual objects).

As used herein, a "resource" may generally refer to objects, products, devices, real estate, goods, commodities, services, currency and the like, and/or the ability and opportunity to access and use the same in the metaverse. Some example implementations herein contemplate digital property held by a user, including property that is stored and/or maintained by a third-party entity.

As used herein, a "resource exchange event" may refer to any transaction, activities, or communication between one or more entities, or between the user and the one or more entities in dealing with a resource. A resource exchange event may refer to any distribution of resources such as, but not limited to, a payment, processing of funds, purchase of goods or services, a return of goods or services, a payment transaction, a credit transaction, or other interactions involving a user's resource. In some embodiments, the user may authorize a resource exchange using at least a resource transfer instrument (e.g., NFT, credit cards, debit cards, checks, digital wallets, currency, loyalty points), and/or payment credentials (account numbers, resource transfer instrument identifiers). Unless specifically limited by the context, a "resource exchange" a "transaction", "transaction event" or "point of transaction event" may refer to any activity between a user, a merchant (virtual or non-virtual), an entity, or any combination thereof. In some embodiments, a resource exchange or transaction may refer to financial transactions involving direct or indirect movement of funds through electronic transaction processing systems in dealing with a resource.

As used herein, a "non-fungible token" or "NFT" may refer to a digital unit of data used as a unique digital identifier for a resource. An NFT may be stored on a distributed ledger that certifies ownership and authenticity of the resource. For purposes of this invention, a distributed ledger (e.g., blockchain) may be a database that is consensually shared and synchronized across multiple sites, institutions, or geographies, accessible by multiple people. A distributed ledger may be associated with independent computers (referred to as nodes) that record, share and synchronize transactions in their respective electronic ledgers (instead of keeping data centralized as in a traditional ledger). As such, NFTs cannot be copied, substituted, or subdivided. In specific embodiments, the NFT may include at least relationship layer, a token layer, a metadata layer(s), and a licensing layer. The relationship layer may include a map of various users that are associated with the NFT and their relationship to one another. For example, if the NFT is purchased by buyer B1 from a seller S1, the relationship between B1 and S1 as a buyer-seller is recorded in the relationship layer. In another example, if the NFT is owned by O1 and the resource itself is stored in a storage facility by storage provider SP1, then the relationship between O1 and SP1 as owner-file storage provider is recorded in the relationship layer. The token layer may include a smart contract that points to a series of metadata associated with the resource, and provides information about supply, authenticity, lineage, and provenance of the resource. The metadata layer(s) may include resource descriptors that provides information about the resource itself (e.g., resource information). These resource descriptors may be stored in the same metadata layer or grouped into multiple metadata layers. The licensing layer may include any restrictions and licensing rules associated with purchase, sale, and any other types of transfer of the resource from one person to another. Those skilled in the art will appreciate that various additional layers and combinations of layers can be configured as needed without departing from the scope and spirit of the invention.

Thus, systems, apparatus, and methods are described in detail below that provide for intelligent authentication/verification for resource exchange events that occur in a virtual environment, such as Metaverse or the like. In addition, to providing for user authentication, the present invention verifies the authenticity/legitimacy of the resource exchange event itself. In this regard, Machine Learning (ML) techniques are implemented to identify user behavior patterns based, at least, on the user's previously conducted virtual environment resource exchange events and, in some embodiments, the user's previously conducted non-virtual (i.e., physical or online) resource exchange events. In response to the user initiating a resource exchange event in the virtual environment, characteristics or the current resource exchange event are compared with the identified user behavior patterns to ensure that the current resource exchange event is consistent with the user's behavior patterns. Such a comparison, verifies that the authenticity/legitimacy of the resource exchange event (i.e., verifies that the resource exchange event is being conducted by the user and not a wrongdoer). In the event that the characteristics of the current resource exchange event do not match the user's behavior patterns, notifications/alerts may be generated and communicated to authorizing entities that take further actions (i.e., personally contact the user or the like) to obtain authentication.

In addition, embodiments of the invention, provide for authentication of the user through user presentation of a Non-Fungible Token (NFT) that is verified through a consensus of decentralized nodes forming a distributed trust computing network (commonly referred to as a "blockchain" network). In further specific embodiments of the invention, the virtual object (i.e., avatar) is verified as being associated with the user based on presentation of a previously generated token or the like that is based on the object identifier.

Thus, embodiments of the present invention provide a heightened level of security for resource exchange events that occur in virtual environments, such as Metaverse or the like. In this regard, the present invention not only intelligently verifies the identity of the user but also verifies the legitimacy of the resource event transaction itself.

Turning now to the figures, FIGS. 1 and 2 illustrate an exemplary distributed ledger technology (DLT) architecture implemented in a distributed trust computing network (commonly referred to as a "blockchain" network), in accordance with an embodiment of the invention. DLT may refer to the protocols and supporting infrastructure that allow computing devices (peers) in different locations to propose and validate events and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of events represented as event objects that are linked. As event objects each include information about the event object previous to it, they are linked with each additional event object, reinforcing the previously ones stored prior. Therefore, distributed ledgers are resistant to modification of their data because once recorded, the data in any given event object cannot be altered retroactively without altering all subsequent event objects.

To permit events and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or may complement a traditional text-based contract and execute certain provisions, such as conducting an event between Party A to Party B. The computer code of the smart contract itself is replicated across multiple nodes (peers) and, therefore, benefits from the security, permanence, and immutability that a distributed ledger offers. That replication also means that as each new event object is added to the distributed ledger, the code is, in effect, executed. If the parties have indicated, by initiating an event, that certain parameters have been met, the code will execute the step triggered by those parameters. If no such event has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general-purpose deployment of decentralized applications. A distributed ledger may be characterized as a public distributed ledger, a consortium distributed ledger, or a private (i.e., non-public and/or proprietary) distributed ledger. A public distributed ledger is a distributed ledger that any entity can access, communicate events to and expect to see them stored thereon if they nodes of the distributed trust computing network come to a consensus and find the events to be valid. Further, any entity can participate in the consensus process for determining which event objects are valid and, therefore, are added to the distributed ledger and determination of the current state of each event object. A public distributed ledger is generally considered to be fully decentralized. On the other hand, a fully private distributed ledger is a distributed ledger in which permissions are kept centralized with one entity (i.e., the entity that controls/owns the private distributed trust computing network and the private distributed ledgers stored thereon). The permissions may be public or restricted to an arbitrary extent. And lastly, a consortium distributed ledger is a distributed ledger where the consensus process is controlled by a pre-selected set of nodes; for example, a distributed ledger may be associated with a specified number of member institutions, each of which operate in such a way that a quorum of the members must sign every event object in order for the event object to be valid. The right to access such a distributed ledger may be public or restricted to the participants. Consortium distributed ledgers may be considered partially decentralized.

As shown in FIG. 1, an exemplary distributed trust computing network 100 includes a distributed ledger 104 being maintained on multiple devices (nodes) 102 that are authorized to keep track of the distributed ledger 104. For example, the nodes 102 may be one or more computing devices such as a comprehensive computing system and one or more client device(s). Each node 102 in the distributed trust computing network 100 may have a complete or partial copy of the entire distributed ledger 104 or set of events and/or event objects 104-A on the distributed ledger 104. Events are initiated at a node and communicated to the various nodes in the distributed trust computing network 100. Any of the nodes 102 can validate an event, record the event to its copy of the distributed ledger 104, and/or broadcast the event, the validation of the event (in the form of an event object) and/or other data to other nodes 102.

As shown in FIG. 2, an exemplary event object 104-A includes an event header 106 and an event object data 108. The event header 106 may include a cryptographic hash of the previous event object 106-A; a nonce 106-B, i.e., a randomly generated 32-bit whole number; a cryptographic hash of the current event object 106-C wedded to the nonce 106-B; and a time stamp 106-D. The event object data 108 may include event information 108-A being recorded. Once the event object 104-A is generated, the event information 108-A is considered signed and forever tied to its nonce 106-B and hash 106-C. Once generated, the event object 104-A is then deployed on the distributed ledger 104. At this time, a distributed ledger address is generated for the event object 104-A, i.e., an indication of where the event object is located on the distributed ledger 104 and captured for recording purposes. Once deployed, the event information 108-A is considered recorded in the distributed ledger 104.

FIG. 3 illustrates an exemplary process of generating a Non-Fungible Token NFT 200, in accordance with an embodiment of the invention. One of ordinary skill in the art will readily appreciate that an NFT is a cryptographic record (referred to as a "token") that is linked to resources, such as digital objects or the like. An NFT is typically stored on a distributed ledger 104 of a distributed trust computing network 100. The storage of the NFT on the distributed ledger 104 means that various nodes 102 of the distributed trust computing network 100 have reached a consensus as to the ownership and validity/authenticity of the NFT, i.e., the linked data.

As shown in FIG. 3, to generate, otherwise referred to as "minting" an NFT, a user (e.g., NFT owner) may identify, using a user input device 202, resources 204 that the user wishes to mint as an NFT. Typically, the resources 204 used to generate the NFTs are digital objects that represent both tangible and intangible objects. These resources 204 may include a piece of art, music, collectible, virtual world items, videos, real-world items such as artwork and real estate, or any other presumed valuable object. These resources 204 are then digitized into a proper format to generate the NFT 206. The NFT 206 may be a multi-layered documentation that identifies the resources 204 but also evidences various event conditions associated therewith.

To record the NFT 206 in a distributed ledger 104, an event object 104-A for the NFT 206 is created using data stored in database 208. As previously discussed in relation to FIG. 2, the event object 104-A includes an event object header 106 and an event object data 108. The event object header 106 includes a cryptographic hash of the previous event object, a nonce (i.e., a random 32-bit whole number generated when the event object is created), a cryptographic hash of the current event object wedded to the nonce, and a time stamp. The event object data 108 includes the NFT 206 being recorded. Once the event object 104-A is generated, the NFT 206 is considered signed and persistently tied to its corresponding nonce and hash. The event object 104-A is then deployed in the distributed ledger 104. At this time, a distributed ledger address is generated for the event object 104-A, i.e., an indication of where the NFT 206 is located on the distributed ledger 104 and captured for recording purposes. Once deployed, the NFT 206 is linked permanently to the corresponding hash and the distributed ledger 104, and is considered recorded in the distributed ledger 104, thus concluding the generation/minting process.

As shown in FIG. 3 and previously discussed in relation to FIG. 1, the distributed ledger 104 may be maintained on multiple devices (nodes) 102 of the distributed trust computing network 100; the multiple nodes 102 are authorized to keep track of the distributed ledger 104. For example, the multiple nodes 104 may be computing devices such as a computing system or end-point device(s). Each node 102 may have a complete or partial copy of the entire distributed ledger 104 or set of events and/or event objects on the distributed ledger 104. Events, such as the creation and recordation of a NFT 206, are initiated at a node 102 and communicated to the various nodes 102. Any of the nodes 102 can validate an event, record the event to the corresponding copy of the distributed ledger 104, and/or broadcast the event, its validation (in the form of an event object 104-A) and/or other data to other nodes 102.

FIG. 4 illustrates an exemplary NFT 206 as a multi-layered documentation of a resource 204, in accordance with an embodiment of an invention. As shown in FIG. 4, the NFT 206 may include at least relationship layer 210, a token layer 220, a metadata layer 230, and, when applicable, a licensing layer 240. The relationship layer 210 may include ownership information 212, including a map of various users that are associated with the resource and/or the NFT 206, and their relationship to one another. For example, if the NFT 206 is purchased by buyer B1 from a seller S1, the relationship between B1 and S1 as a buyer-seller is recorded in the relationship layer 210. In another example, if the NFT 206 is owned by O1 and the resource itself is stored in a storage facility by storage provider SP1, then the relationship between O1 and SP1 as owner-file storage provider is recorded in the relationship layer 210. The token layer 220 may include a token identification number 222 that is used to identify the NFT 206. The metadata layer 230 may include at least a file location 232 and a file descriptor 234. The file location 232 provides information associated with the specific location of the resource 204. Depending on the conditions listed in the smart contract underlying the distributed ledger 104, the resource 204 may be stored on-chain, i.e., directly on the distributed ledger 104 along with the NFT 206, or off-chain, i.e., in an external storage location. The file location 232 identifies where the resource 204 is stored. The file descriptor 234 includes specific information associated with the source itself. For example, the file descriptor 234 may include information about the supply, authenticity, lineage, provenance of the resource 204. The licensing layer 240 may include any transferability parameters 242 associated with the NFT 206, such as restrictions and licensing rules associated with purchase, sale, and any other types of transfer of the resource 204 and/or the NFT 206 from one person to another. Those skilled in the art will appreciate that various additional layers and combinations of layers can be configured as needed without departing from the scope and spirit of the invention.

As shown in FIG. 5, an exemplary machine learning subsystem architecture 300 is depicted in accordance with embodiments of the present of the present invention. The machine learning subsystem 300 includes a data acquisition engine 302, data ingestion engine 310, data pre-processing engine 316, Machine learning (ML) model tuning engine 322, and inference engine 336.

The data acquisition engine 302 identifies various internal and/or external data sources to generate, test, and/or integrate new features for training the machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. The data acquired by the data acquisition engine 302 from these data sources 304, 306, and 308 is then transported to the data ingestion engine 310 for further pre-processing.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a high volume of computing resources to process. Feature extraction and/or selection may be used to select and/or combine variables into features, effectively reducing the amount of data that must be processed, while still accurately and completely describing the original data set.

Depending on the type of machine learning algorithm being used the training data 318 may require further enrichment. For example, in supervised learning, the training data 318 is enriched using one or more meaningful and informative labels to provide context so a machine learning model can learn from it. For example, in specific examples, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 322 may be used to train a machine learning model 324 using the training data 318 to make predictions or decisions without explicitly being programmed to do so. The machine learning model 324 represents what was learned by the selected machine learning algorithm(s) 320 and represents the rules, numbers, and any other algorithm-specific data structures required for classification. Selecting the right machine learning algorithm 320 depends on a number of different factors, such as, but not limited to, the problem statement and the kind of output needed; type and size of the data; the available computational time; number of features and observations in the data; and/or the like. Machine learning algorithms 320 may refer to programs (math and logic) that are configured to self-adjust and perform better in response to being exposed to more data. To this extent, machine learning algorithms 320 are capable of adjusting their own parameters, given feedback on previous performance in making prediction about a dataset.

The machine learning algorithms 320 contemplated, described, and/or used herein include supervised learning (e.g., using logistic regression, using back propagation neural networks, using random forests, decision trees, or the like.), unsupervised learning (e.g., using an Apriori algorithm, using K-means clustering or the like), semi-supervised learning, reinforcement learning (e.g., using a Q-learning algorithm, using temporal difference learning), and/or any other suitable machine learning model type. Each of these types of machine learning algorithms 320 can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, AdaBoost, stacked generalization, gradient boosting machine method, random forest method, or the like), and/or the like.

To tune the machine learning model 324, the ML model tuning engine 322 may repeatedly execute cycles of experimentation/initialization 326, testing 328, and calibration 330 to optimize the performance of the machine learning algorithm 320 and refine the results in preparation for deployment of those results for consumption or decision making. To this end, the ML model tuning engine 322 may dynamically vary hyperparameters each iteration (e.g., number of trees in a tree-based algorithm or the value of alpha in a linear algorithm), run the algorithm on the data again, then compare the performance on a validation set to determine which set of hyperparameters results in the most accurate model. The accuracy of the ML model 324 is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical decisions based on live data 334, in this instance received emails. To this end, the machine learning subsystem 300 uses the inference engine 336 to make such decisions. The type of decision-making may depend upon the type of machine learning algorithm used. For example, trained machine learning models 332 trained using supervised learning algorithms may be used to structure computations in terms of categorized outputs (e.g., $C\_1, C\_2 \ldots C\_n$ 338) or observations based on defined classifications, represent possible solutions to a decision based on certain conditions, model complex relationships between inputs and outputs to find patterns in data or capture a statistical structure among variables with unknown relationships, and/or the like. On the other hand, trained machine learning models 332 trained using unsupervised learning algorithms may be used to group (e.g., $C\_1, C\_2 \ldots C\_n$ 338) live data 334 based on how similar they are to one another to solve exploratory challenges where little is known about the data, provide a description or label (e.g., $C\_1, C\_2 \ldots C\_n$ 338) to live data 334, such as in classification, and/or the like. These categorized outputs, groups (clusters), or labels are then presented as output/results 340.

It will be understood that the embodiment of the machine learning subsystem 300 illustrated in FIG. 5 is exemplary and that other embodiments may vary. As another example, in some embodiments, the machine learning subsystem 300 may include more, fewer, or different components.

Referring to FIG. 1 a schematic diagram is presented of an exemplary system 100 for AI detection of malware threats based on behaviors of the computing system in the presence of malware software, in accordance with embodiments of the present invention. As depicted, the system 100 includes a first computing platform 200 and a second computer platform 300. However, one of ordinary skill in the art will appreciate that the functionality described herein as being performed within first computing platform 200 may be performed within second computing platform 300 or additional computing platforms and/or the functionality described herein as being performed within second computing platform 300 may be performed within first computing platform 200 or additional computing platforms. As such, the system 100 may include one solitary computing platform, or, in other embodiments, computing platforms in addition to first computing platform 200 and second computing platform 300.

First computing platform 200 includes a first memory 202 and one or more first processing devices 204 in communication with the first memory 202. The first memory stores instructions 210 that are executable by the first processing device(s) 204. The first instructions are configured to determine/observe one or more behaviors 230 of a computing system 400 while it is in the presence of malware software 220, which, in specific embodiments of the invention, may be ransomware software. The computing system 400, which may comprise one or multiple computing devices, is part of computing network 110, which typically comprises multiple other computing systems. As used herein, the "behaviors" refers to any computing system event/activity or computing system configuration that occurs in the presence of malware/ransomware software (i.e., after the malware has penetrated the perimeter of the computing system). In those embodiments of the method, in which the malware software 220 is ransomware software, the behaviors 220 may be any computing system event or configuration that occurs prior to encryption of files. In specific embodiments of the system, the behaviors 220 are determined/observed via implementation of AI and, specifically ML techniques.

The instructions 210 are further configured to train, over time, one or more AI algorithms 250 to monitor 260 for the determined behaviors 230. Further the instructions are configured to train, over time, the AI algorithm(s) to determine one or more actions 270 to take specific to the determined behaviors 230 in response to behavior detection 230 and determining that an acceptable baseline level 290 has been exceeded for the behavior 230 and initiate the occurrence of the one or more actions 270. The actions 270 are taken to mitigate (limit further propagation of the malware beyond the computing system) or prevent (stop the malware from detonating within the computing system) the threat posed by the malware/ransomware software. The acceptable baseline level 290 is the normal amount that the computing system experiences absent the presence of the malware software 220 and/or or the normal configuration of the system 400 absent the malware software 220. The acceptable baseline levels 290 for each behavior may be predetermined or may dynamically change based on known threats or changes in utilization of the computing system and/or network. The actions that occur may include, but are not limited to, initiating communication of alerts, isolating the computing system (i.e., one or more computing devices) from the network, reconfiguring the computing system, shutting down the computing system and the like.

System 100 additionally includes second computing platform 300 having a second memory 302 and one or more second processing devices 304 in communication with the second memory 302. The second memory 302 stores trained AL algorithms 250, which are executable by the second processing device(s) 304. The AI algorithm(s) 250 are configured to monitor 260 for the occurrence of the one or more behaviors 230 within computing system 400. The AI algorithms 250 are further configured to implement AI/ML to determine one or more actions 270 in response to behavior detection 280 and determining that an acceptable baseline level 290 has been exceeded for the behavior 230 and initiate the occurrence of the one or more actions 270

Referring to FIG. 2, a block diagram is depicted of first computing platform 200, in accordance with embodiments of the present invention. In addition to providing greater detail, FIG. 2 highlights various alternate embodiments of the system 200. First computing platform 200 comprises one or more computing devices/apparatus, such as application server(s), storage servers or the like configured to execute software programs, including instructions, engines, algorithms, modules, routines, applications, tools, and the like. First computing platform 200 includes first memory 202, which may comprise volatile and non-volatile memory, such as read-only and/or random-access memory (RAM and ROM), EPROM, EEPROM, flash cards, or any memory common to computer platforms). Moreover, first memory 202 may comprise cloud storage, such as provided by a cloud storage service and/or a cloud connection service.

Further, first computing platform 200 also includes first processing device(s) 204, which may be an application-specific integrated circuit ("ASIC"), or other chipset, logic circuit, or other data processing device. First processing device 204 may execute an application programming interface ("API") 206 that interfaces with any resident programs, such as instructions 210 and sub-engines/routines associated therewith or the like stored in the first memory 202 of the first computing platform 200.

First processing device 204 may include various processing subsystems (not shown in FIG. 2) embodied in hardware, firmware, software, and combinations thereof, that enable the functionality of first computing platform 200 and the operability of first computing platform 200 on a distributed communication network. For example, processing subsystems allow for initiating and maintaining communications and exchanging data with other networked devices. For the disclosed aspects, processing subsystems of first processing device 204 may include any subsystem used in conjunction with instructions 210 and related sub-engines/routines, algorithms, sub-algorithms, modules, sub-modules thereof.

First computing platform 200 additionally includes a communications module (not shown in FIG. 2) embodied in hardware, firmware, software, and combinations thereof, that enables electronic communications between first computing platform 200 and other networks and/or networked devices, such as, second computing platform 300 and computing system 400. Thus, the communication module may include the requisite hardware, firmware, software and/or combinations thereof for establishing and maintaining a network communication connection with one or more systems, platforms, networks, or the like.

As previously discussed in relation to FIG. 1, first memory 202 of computing platform 200 stores instructions 210 that are configured to observe/determine one or more behaviors 230 within a computing system 400 that occur in the presence of malware software 220 and, in specific embodiments of the invention, ransomware software 222. The behaviors 230 may be any computing system event or computing system configuration that occurs in the presence of malware/ransomware software 220, 222 (i.e., after the malware/ransomware 220, 222 has penetrated the periphery of the computing system 400). In those embodiments of the system, in which the malware 220 is ransomware 222, the behaviors may be any computing system event or configuration that occurs prior to encryption of files.

In specific embodiments of the method, the behaviors are determined/observed via implementation of AI and, specifically ML techniques 221. In further specific embodiments of the method, the behaviors are determined/observed as a result of an actual malware attack occurring at the computing system 400. While in other embodiments of the method, the behaviors may be determined/observed based on a simulated malware attack occurring within a test computing system environment or the like.

The behaviors 230 that are determined/observed may include, but are not limited to, (i) specific disk input/output calls 231, (ii) memory utilization 232, (iii) processing unit (i.e., central and or graphical) utilization 233, (iv) files accessed 234, (v) types/volume of calls made to operating system 235, (vi) ports and protocols 236 used for calls, (vii) attempts to escalate access privileges 237 and other behaviors (i.e., other computing system events and/or computing system configurations).

In specific embodiments of the system, the behaviors 230 that are observed/determined, typically via implementation of AI/ML 212, are patterns of behaviors 230-1. A pattern of behaviors 230-1 as used herein comprises two or more behaviors 230 that occur either in parallel or in sequence. In addition, the pattern of behaviors may have additional parameters that define requirements for detecting the pattern, such as timing requirements, order of behaviors and the like.

In other embodiments of the system, the behaviors are analyzed, using ML techniques, to determine the impact from changes to the computing system on the behaviors. The changes may include, but are not limited to, (i) hardware and/or software configuration within the computing system, (ii) service packs installed on the computing system, (iii) operating system revisions and the like.

In response to determining/observing the behaviors 230, the instructions 210 are configured to train 240, one or more AI algorithm(s) 250 to (i) monitor 260 for the occurrence of the behaviors 230 or patterns of behaviors 230-1, and (ii) in response to detecting the occurrence of the behavior 230 or pattern of behaviors 230-1 and determining that the occurrence exceeds an acceptable baseline level 280 for the behavior 230 or pattern of behaviors 230-1, determine one or more actions 290 specific to the behaviors and the amount by which the baseline level 280 is exceeded and initiate the occurrence of the one or more actions 290 to mitigate (limit further propagation of the malware beyond the computing system) or prevent (stop the malware from detonating within the computing system) the threat posed by the malware/ransomware software. Acceptable baseline levels 280 may be predetermined for the computing system 400 or may be dynamically assigned based on current malware threat levels or current utilization of the computing system/network.

The actions 290 that occur may include, but are not limited to, initiating communication of alerts, isolating the computing system from the network, reconfiguring the computing system, shutting down the computing system and the like. In specific embodiments of the invention, the instructions 210 may be configured for action determination 292, in which the actions 290 are determined based on action rules 294 applicable to the behaviors 230. Specifically, the action rules 294 may dictate which actions 290 occur based on the behavior 230 or pattern of behaviors 230-1 observed and, in some embodiments, attributes of the behavior 230, e.g., timing of the behavior 230, volume of the behavior 230, type of behavior 230, timing between behaviors 230 in a pattern of behaviors 230-1, sequence of behaviors 230 in a pattern of behavior 230-1 or the like.

In other embodiments of the system 100, the AI algorithms 250 are additionally trained with malware indications 222, including known/existing indicators 224 (e.g., digital signatures) or future known/new emerging indicators 226 (i.e., industry identified indicators), which indicate the presence of malware. In such embodiments of the system, the action(s) 290 may be initiated in response to detection of behavior(s) 230 and one or more indicators 222.

Referring to FIG. 3, a flow diagram is depicted of a method 400 for AI detection and prevention of malware threats based on behaviors of the computing system in the presence of malware software, in accordance with embodiments of the present invention. In specific embodiments the method 400 is operating system-agnostic, meaning that it can be implemented on a computing system executing any known or future known operating system. At Event 410, one or more behaviors are observed/determined within a computing system that occur in the presence of malware software and, in specific embodiments of the invention, ransomware software. The behaviors may be any computing system event or computing system configuration that occurs in the presence of malware/ransomware software (i.e., after the malware has penetrated the periphery of the computing system). In those embodiments of the method, in which the malware is ransomware, the behaviors may be any computing system event or configuration that occurs prior to encryption of files.

In specific embodiments of the method, the behaviors are determined/observed via implementation of AI and, specifically ML techniques. In further specific embodiments of the method, the behaviors are determined/observed as a result of an actual malware attack occurring at the computing system. While in other embodiments of the method, the behaviors may be determined/observed based on a simulated malware attack occurring within a test computing system environment or the like.

The behaviors that are determined/observed may include, but are not limited to, (i) specific disk input/output calls, (ii) memory utilization, (iii) processing unit (i.e., central and or graphical) utilization, (iv) files accessed, (v) types of calls made to operating system, (vi) ports and protocols used for calls, (vii) attempts to escalate access privileges and the like.

In specific embodiments of the method, the behaviors that are observed/determined, typically via implementation of AUML, are patterns of behaviors. A pattern of behavior as used herein comprises two or more behaviors that occur either in parallel or in sequence. In addition, the pattern of behaviors may have additional parameters that define requirements for detecting the pattern, such as timing requirements, order of behaviors and the like.

In other embodiments of the method, the behaviors are analyzed, using ML techniques, to determine the impact from changes to the computing system on the behaviors. The changes may include, but are not limited to, (i) hardware and/or software configuration within the computing system, (ii) service packs installed on the computing system, (iii) operating system revisions and the like.

In response to determining/observing the behaviors, at Event 420, AI algorithm(s) are trained, over time, to (i) monitor for the occurrence of the behaviors or patterns of behaviors, and (ii) in response to detecting the occurrence of the behavior or pattern of behaviors and determining that the occurrence exceeds an acceptable baseline level for the behavior, initiate one or more actions to mitigate (limit further propagation of the malware beyond the computing system) or prevent (stop the malware from detonating within the computing system) the threat posed by the malware/ransomware software. Acceptable baseline levels may be predetermined for the computing system.

The actions that occur may include, but are not limited to, initiating communication of alerts, isolating the computing system from the network, reconfiguring the computing system, shutting down the computing system and the like. In specific embodiments of the invention, the actions may be determined based on rules applicable to the behaviors. Specifically, the rules may dictate which actions occur based on the behavior or pattern of behaviors observed and, in some embodiments, attributes of the behavior, e.g., timing of the behavior, volume of the behavior, type of behavior, timing between behaviors in a pattern of behaviors, sequence of behaviors in a pattern of behavior or the like.

In other embodiments of the invention, the AI algorithms are additionally trained with existing indicators (e.g., digital signatures) or new emerging indicators (i.e., industry identified indicators), which indicate the presence of malware. In such embodiments of the method, the action(s) may be initiated in response to detection of behavior(s) and one or more indicators.

Once trained, at Event 430, the AI algorithm(s) are executed and monitoring for the occurrence of behaviors of patterns of behaviors commences. At Event 440, in response in response to detecting the occurrence of the behavior or pattern of behaviors and determining that the occurrence exceeds an acceptable baseline level for the behavior, initiate one or more actions to mitigate or prevent the threat posed by the malware/ransomware software.

Referring to FIG. 6, a schematic/block diagram is presented of a system 400 for authorizing a resource exchange event in a virtual environment, in accordance with embodiments of the present invention. The system includes a distributed trust computing network 100 having a plurality of decentralized nodes 102. Each node 102 has a memory (not shown in FIG. 6) and one or more processing devices (not shown in FIG. 6) in communication with the memory. The memory of the decentralized nodes 102 stores one or more distributed ledgers 104, with each distributed ledger including a series of data blocks (not shown in FIG. 6). In response to a virtual object (e.g., avatar or the like) associated with a user initiating a virtual resource exchange event 510 within a virtual environment 500 (e.g., a metaverse or the like), the distributed computing network 100 receives, via distributed communication network 310, a Non-Fungible Token (NFT) 520 that is associated with the user. In response, a plurality of the decentralized nodes 102 are configured to validate the NFT 520 (i.e., authenticate the user) and, in response store a data block associated with the resource exchange event 510 within one of the distributed ledger 104.

System 400 additionally includes first computing platform 600 that includes a memory 602 and one or more processing devices 604 in communication with memory 602. Memory 602 stores virtual resource exchange event authorizer tool 610 that is executable by at least one of the processing device(s) 604. The authorizer tool 610 is configured to implement one or more Machine Learning (ML) algorithms to learn one or more user behavior patterns 630 that indicate a pattern of behavior exhibited by the user when conducting, at least, prior virtual resource exchange events 640. In this regard, the ML algorithms 620 provide for generating one or more trained ML models (not shown in FIG. 6) that configured to detect an occurrence of user behavior patterns 630.

In response to receiving data 512 associated with the virtual resource exchange event 510 being initiated by the virtual object, authorizer tool 610 is configured to apply the one or more user behavior patterns 622 to the data 512 associated with the virtual resource exchange event 622 to determine whether the virtual resource exchange event 510 is authentic/legitimate (i.e., being initiated by the user). In specific embodiments of the system, the data 512 is received from the distributed trust computing network 100, via the distributed communication network 310, in response to validation of the NFT 520. In specific embodiments of the system 400, application of the user behavior patterns 622 to the data 512 entails executing the trained ML models to determine whether the virtual resource exchange event 510 is authentic/legitimate.

In response to (i) the distributed trust computing network 100 validating the NFT 520, and (ii) authentication 660 of the virtual resource exchange event 510, authorizer tool 610 is configured to authorize 680 processing of the virtual resource exchange event 510 (i.e., authorize initiation of a payment process for completing a payment transaction or the like).

Referring to FIG. 7, a block diagram is presented of first computing platform 600 configured for virtual resource exchange event authorization, in accordance with embodiments of the present invention. In addition to providing greater details of the first computing platform 600 and authorizer tool 610, FIG. 7 highlights various alternate embodiments of the invention. First computing platform 600 may comprise one or multiple devices, such as servers, storage devices and the like that are in wired and/or wireless communication with one another. First computing platform 600 includes memory 602, which may comprise volatile and non-volatile memory, such as read-only and/or random-access memory (RAM and ROM), EPROM, EEPROM, flash cards, or any memory common to computing platforms). Moreover, memory 602 may comprise cloud storage, such as provided by a cloud storage service and/or a cloud connection service.

Further, first computing platform 600 also includes one or more processing devices 604, which may be an application-specific integrated circuit ("ASIC"), or other chipset, logic circuit, or other data processing device. Processing device(s) 604 may execute one or more application programming interface (APIs) 606 that interface with any resident programs, such as virtual resource exchange event authorizer tool 610 or the like, stored in memory 610 of first computing platform 600 and any external programs. Processing devices(s) 604 may include various processing subsystems (not shown in FIG. 7) embodied in hardware, firmware, software, and combinations thereof, that enable the functionality of first computing platform 600 and the operability of first computing platform 600 on a distributed communications network 310 (shown in FIG. 6), such as the Internet, intranet(s), cellular network(s) and the like. For example, processing subsystems allow for initiating and maintaining communications and exchanging data with other networked devices. For the disclosed aspects, processing subsystems of first computing platform 600 may include any subsystem used in conjunction with virtual resource exchange event authorizer tool 610 and related tools, routines, sub-routines, algorithms, sub-algorithms, sub-modules thereof.

In specific embodiments of the present invention, first computing platform 600 additionally includes a communications module (not shown in FIG. 7) embodied in hardware, firmware, software, and combinations thereof, that enables electronic communications between the first computing platform 600 and other networks and network devices, such as user devices experiencing the virtual environment 500, the distributed trust computing network 100 and the like. Thus, communication module may include the requisite hardware, firmware, software and/or combinations thereof for establishing and maintaining a network communication connection with one or more devices and/or networks.

Memory 602 of first computing network 600 stores virtual resource exchange event authorizer tool 610 which is configured to implement one or more Machine Learning (ML) algorithms to learn one or more user behavior patterns 630 that indicate a pattern of behavior exhibited by the user when conducting, at least, prior virtual resource exchange events 640. The user behavior patterns 630 may be based on, but are not limited to, (i) metaverses 641 or areas of the virtual environment 642 in which prior virtual resource exchange events occurred, (ii) virtual resources exchange providers 642 at which the user conducted prior virtual resource exchange events 640, (iii) amounts 643 of prior virtual resource exchange events 640, (iv) times 644 of day, week, month or the like at which the prior virtual resource exchange events 640 were conducted, (v) items/services 645 acquired by the user in prior virtual resource exchange events 640, (vi) geographic location of the user when the prior virtual resource exchange events 640 were conducted, and the like. In such embodiments of the invention, weighting schemes may be implemented, such that certain basis for the user behavior patterns are given more or less weight in the determination of a user behavior pattern 630.

In specific embodiments of the invention, user behavior patterns 630 indicate a pattern of behavior exhibited by the user when conducting prior virtual resource exchange events 640, but also prior non-virtual (e.g., physical location or online) resource exchange events 650. In this regard, the ML algorithms 620 provide for generating one or more ML models (not shown in FIG. 7) that are trained on data from prior virtual and non-virtual resource exchange events 640, 650. In such embodiments of the invention, weighting schemes may be implemented such that the prior virtual resource exchange events are weighted more heavily in the determination of user behavior patterns 630. In such embodiments of the invention, the user behavior patterns 630 may be further based on, but are not limited to, (i) non-virtual resources exchange providers 651 at which the user conducted prior non-virtual resource exchange events 650, (iii) amounts 652 of prior non-virtual resource exchange events 650, (iv) times 653 of day, week, month or the like at which the prior non-virtual resource exchange events 650 were conducted, (v) items/services 654 acquired by the user in prior non-virtual resource exchange events 650, (vi) geographic location of the user when the prior non-virtual resource exchange events 650 were conducted, and the like.

In response to receiving data 512 associated with the virtual resource exchange event 510 being initiated by the virtual object, authorizer tool 610 is configured to apply the one or more user behavior patterns 622 to the data 512 associated with the virtual resource exchange event 622 to determine whether the virtual resource exchange event 510 is authentic/legitimate (i.e., being initiated by the user). In specific embodiments of the system, the data 512 is received from the distributed trust computing network 100, via the distributed communication network 310, in response to validation of the NFT 520. In specific embodiments of the system 400, application of the user behavior patterns 622 to the data 512 entails executing the trained ML models to determine whether the virtual resource exchange event 510 is authentic/legitimate.

In alternate embodiments of the invention, a second computing platform (not shown in FIG. 7) may be implemented, which includes a memory and one or more processing devices in communication with the memory. The memory stores a resource exchange event user behavior pattern detection tool that is executable by at least one of the processing device(s) and is configured to implement ML algorithms to learn one or more second user behavior patterns. The second user behavior patterns each indicating a pattern of behavior of the user is conducting prior non-virtual (e.g., physical location or online). In this regard, separate user behavior patterns may be identified for the virtual resource exchange events 640 and the non-virtual resource exchange events 650. In such embodiments of the invention, virtual resource exchange event authorizer tool 610 is configured to apply the one or more user behavior patterns 622 and the one or more second user behavior patterns to the data 512 associated with the virtual resource exchange event 622 to determine whether the virtual resource exchange event 510 is authentic/legitimate (i.e., being initiated by the user).

In alternate embodiments of the invention, a second computing platform (not shown in FIG. 7) may be implemented, which includes a memory and one or more processing devices in communication with the memory. The memory stores a token generator tool that is configured to generate a virtual object authenticator token 532 that associates the user with a virtual object identifier that identifies the virtual object 530 being used by the user. The user's identity may be verified based on the verification of the NFT 520 at the distributed trust computing network 100 or via user input of requisite identification credentials. Virtual object authenticator token 532 may be configured to generate the token 532 on a per user virtual environment session basis, as the user may choose to associate with different virtual objects (e.g., avatars) on a session-by session basis. In such embodiments of the invention, virtual resource exchange event authorizer tool 610 is configured to receive or access the virtual object authentication token 532 to authenticate 670 the virtual object 530.

In response to (i) the distributed trust computing network 100 validating the NFT 520, and (ii) authentication 660 of the virtual resource exchange event 510 and, in specific embodiments, (iii) authentication 670 of the virtual object 530, authorizer tool 610 is configured to authorize 680 processing of the virtual resource exchange event 510 (i.e., authorize initiation of a payment process for completing a payment transaction or the like).

In specific embodiments of the invention, in response to failing to authorize 680 processing of the virtual resource exchange event 510, authorizer tool 610 is configured to generate and initiate communication of an alert 690 to one or more predetermined entities. The alert 690 notifies the entities of the failure to authorize 680 and, in response, the entities may take action to rectify the failure to authorize (e.g., personally contact the user to verify user identity and/or the virtual resource exchange event).

In other specific embodiments of the invention, the authorizer tool 610 is configured to generate and initiate communication of user behavior patterns reports 692 to one or more predetermined entities. The user behavior reports 692 indicate the basis for user behavior patterns 630. Additionally, the authorizer tool 610 may be configured to generate and initiate communication of other reports, such as reports that indicate the failures in authorizing 680 processing of the virtual resource exchange event 510 and the rational for making such determinations.

Referring to FIG. 8, a flow/schematic diagram is presented of a methodology 700 for authorizing a virtual resource exchange event 510, in accordance with embodiments of the present invention. A virtual resource exchange event is initiated within a virtual environment 500 and, in response an NFT is presented to a distributed trust computing network 100. Decentralized of the distributed trust computing network converge on the NFT to validate the NFT. In response to validation of the NFT, at Event 830, a data block associated with the virtual resource exchange event is added to a distributed ledger of the distributed trust computing network and data/characteristics of the virtual resource exchange event are communicated to the trained machine learning models 650. The models 650 apply previously learned user behavior patterns 622 to the virtual resource exchange data 512 to decision 710 whether the virtual resource exchange event can be authorized or should be rejected. If authorized, communication is sent back to the virtual environment 500 to notify the user, via the associated virtual object/avatar, that the resource exchange event has been authorized. If rejected, an authorization rejection alert 690 is generated and communicated to one or more predetermined entities notifying the entity of the rejection so that the entity can determine whether further action to rectify (or confirm) the rejection is necessary. In addition, the decision 710 results are fed back to the machine learning models 650 so that further learning continues to occur as virtual resource exchange events further occur.

Referring to FIG. 9, a flow diagram is presented of a computer-implemented method 800 for authorizing a virtual resource exchange event 510, in accordance with embodiments of the present invention. In response a virtual object (e.g., avatar) associated with a user initiating a virtual resource exchange event (e.g., virtual purchase transaction) in a virtual environment (e.g., a metaverse or the like), at Event 810, a Non-Fungible Token (NFT) associated with the user is received at a distributed trust computing network and, at Event 820, a plurality of the decentralized of the distributed trust computing network validate the NFT. In this regard, the NFT serves as the user's resource exchange vehicle and validation serves to authenticate the user. In response to validation of the NFT, at Event 830, a data block associated with the virtual resource exchange event is added to a distributed ledger of the distributed trust computing network.

At Event 840, one or more Machine Learning (ML) algorithms are implemented to learn one or more user behavior patterns. Each user behavior patterns indicates a pattern of behavior of the user in conducting, at least, prior virtual resource exchange events. In specific embodiments of the invention, the user behavior patterns further indicate a pattern of behavior in conducting virtual and non-virtual resource exchange events. In other specific embodiments of the invention first user behaviors are learned that indicate a pattern of behavior of the user in conducting prior virtual resource exchange events and second user behavior patterns are learned or otherwise determined that indicate a pattern of behavior of the user in conducting prior virtual resource exchange events. In specific embodiments of the method the user behavior patterns are learned by implementing ML algorithm(s) to train one or more ML models. In further specific embodiments of the method, the basis for the user behavior patterns include one or more of, but are not limited to, (i) areas/metaverses where the prior virtual resource exchange events occurred, (ii) virtual and non-virtual resource exchange providers at which the prior resource exchange events occurred, (iii) amounts of the prior virtual or non-virtual resource exchange events, (iv) time of day, week, month or the like at which the prior resource exchange events occurred, (v) types of items/services exchanged in the prior resource exchange events, and (vi) geographic location of the user at the time the virtual or non-virtual resource exchange event occurred.

In response to receiving data/characteristics of the virtual resource exchange event being initiated, at Event 850, ML techniques are implemented (e.g., trained ML models are executed) to apply the user behavior patterns to the data associated with the virtual resource exchange event to determine whether the virtual resource exchange event is authentic/legitimate (i.e., actually being performed by the user as opposed to a wrongdoer). In additional specific embodiments of the method, a token that associates the virtual object to the user is generated and presented as a means of authenticating the virtual object.

In response to (i) validating the NFT at the distributed trust computing network, (ii) authenticating the virtual resource exchange event and, in specific embodiments of the method, (iii) authenticating the virtual object, at Event 860, the virtual resource exchange event is authorized for processing (i.e., payment is authorized to occur or the like). Alternatively, in response to failing to authenticate the virtual resource exchange event, an alert is generated and communicated to one or more entities that may be responsible for escalating the authorization process (i.e., contacting the user manually to authenticate the virtual resource exchange event or the like).

Thus, present embodiments of the invention provide systems, methods, computer program products and/or the like for intelligent authentication/verification for resource exchange events that occur in a virtual environment, such as Metaverse or the like. In addition, to providing for user authentication, the present invention verifies the authenticity/legitimacy of the resource exchange event itself. In this regard, Machine Learning (ML) techniques are implemented to identify user behavior patterns based, at least, on the user's previously conducted virtual environment resource exchange events and, in some embodiments, the user's previously conducted non-virtual (i.e., physical or online) resource exchange events. In response to the user initiating a resource exchange event in the virtual environment, characteristics or the current resource exchange event are compared with the identified user behavior patterns to ensure that the current resource exchange event is consistent with the user's behavior patterns. Such a comparison, verifies that the authenticity/legitimacy of the resource exchange event (i.e., verifies that the resource exchange event is being conducted by the user and not a wrongdoer).

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating a user and a virtual resource exchange event, the system comprising:
 a distributed trust computing network comprising a plurality of decentralized nodes, each decentralized node having a first memory and one or more first processing devices in communication with the first memory, wherein the first memory of the decentralized nodes is configured to store one or more distributed ledgers, each distributed ledger comprising a plurality of data blocks, wherein in response to a virtual object associated with the user initiating the virtual resource exchange event, a Non-Fungible Token (NFT) associated with the user is received by the distributed trust computing network and a plurality of the decentralized nodes are configured to validate the NFT, and, in response to validating the NFT, store a data block associated with virtual resource exchange event within one of the one or more distributed ledgers, wherein validating the NFT serves to authenticate the user; and a first computing platform including a second memory and one or more second processing devices in communication with the second memory, wherein the second memory stores a virtual resource exchange event authorizer tool that is executable by at least one of the one or more second processing devices and is configured to:

implement one or more Machine Learning (ML) algorithms to:

learn one or more first user behavior patterns, each first user behavior pattern indicating a pattern of behavior of the user in conducting, at least, prior virtual resource exchange events, and in response to receiving data associated with the virtual resource exchange event being initiated by the virtual object, apply the one or more first user behavior patterns to the data associated with the virtual resource exchange event to determine whether the virtual resource exchange event is authentic, and in response to (i) the distributed trust computing network validating the NFT, and (ii) determining that the virtual resource exchange event is authentic, authorize processing of the virtual resource exchange event.

2. The system of claim 1, further comprising a second computing platform including a third memory and one or more third processing devices in communication with the third memory, wherein the third memory stores a token generator tool that is executable by at least one of the one or more third processing devices and is configured to generate a virtual object authentication token that associates the user with a virtual object identifier that identifies the virtual object used by the user, wherein the virtual resource exchange event authorizer tool is configured to receive or access the virtual object authentication token to authenticate the virtual object and wherein authorizing processing of the virtual resource exchange event is in further response to (iii) authenticating the virtual object.

3. The system of claim 1, the virtual resource exchange event authorizer tool is configured to implement the one or more Machine Learning (ML) algorithms to learn the one or more first user behavior patterns, wherein the first user behavior patterns are based on at least one of one or more metaverses and one or more virtual resource exchange providers at which the user conducted the prior virtual resource exchange events.

4. The system of claim 1, the virtual resource exchange event authorizer tool is configured to implement the one or more Machine Learning (ML) algorithms to learn the one or more first user behavior patterns, wherein the first user behavior patterns are based on at least one of a type of item or service obtained by the user or an amount of resources exchanged by the user in the prior virtual resource exchange events.

5. The system of claim 1, the virtual resource exchange event authorizer tool is configured to implement the one or more Machine Learning (ML) algorithms to learn the one or more first user behavior patterns, wherein the first user behavior patterns are based on the geographic-location of the user when conducting the prior virtual resource exchange events.

6. The system of claim 1, the virtual resource exchange event authorizer tool is configured to implement the one or more Machine Learning (ML) algorithms to learn one or more first user behavior patterns, each first user behavior pattern indicating a pattern of behavior of the user in conducting, at least one of, the prior virtual resource exchange events and prior non-virtual resource exchange events, wherein non-virtual resource exchange events include physical location resource exchange events and online resource exchange events.

7. The system of claim 6, the virtual resource exchange event authorizer tool is configured to implement the one or more Machine Learning (ML) algorithms to learn the one or more first user behavior patterns, wherein the first user behavior patterns are based on at least one of (i) a type of item or service obtained by the user in the prior non-virtual resource exchange events, (ii) an amount of resources exchanged by the user in the prior non-virtual resource exchange events, (iii) a geographic-location of the user when conducting the prior non-virtual resource exchange events, and (iv) one or more physical or online resource exchange providers at which the prior non-virtual resource exchange events occurred.

8. The system of claim 1, further comprising a second computing platform including a third memory and one or more third processing devices in communication with the third memory, wherein the third memory stores a resource exchange event pattern detection tool that is executable by at least one of the one or more third processing devices and is configured to implement one or more Machine Learning (ML) algorithms to learn one or more second user behavior patterns, each second user behavior pattern indicating a pattern of behavior of the user in conducting prior non-virtual resource exchange events, wherein the virtual resource exchange event authorizer tool is further configured to implement the one or more Machine Learning (ML) algorithms to apply the one or more first user behavior patterns and the one or more second user behavior patterns to the data associated with the virtual resource exchange event to determine whether the virtual resource exchange event is authentic.

9. The system of claim 1, wherein the virtual resource exchange event authorizer tool is further configured to in response to (i) the distributed trust computing network failing to validate the NFT, or (ii) failing to determine that the virtual resource exchange event is authentic, generate and initiate electronic communication of an alert to one or more predetermined entities that notifies the one or more predetermined entities that the virtual resource exchange event has not been authorized for processing.

10. The system of claim 1, wherein the virtual resource exchange event authorizer tool is further configured to generate one or more user behavior reports that indicate the one or more pattern of behaviors of the user in conducting, at least, the prior virtual resource exchange events.

11. A computer-implemented method for authenticating a user and a virtual resource exchange event, the computer-implemented method is executable by one or more computing processor devices, the method comprising:

in response to a virtual object associated with a user initiating the virtual resource exchange event, receiving, at a distributed trust network, a Non-Fungible Token (NFT) associated with the user;
validating, by a plurality of decentralized nodes of the distributed trust computing network, the NFT, wherein validating the NFT serves to authenticate the user;
in response to validating the NFT, storing a data block associated with virtual resource exchange event within a distributed ledger of the distributed trust computing network;
implementing one or more Machine Learning (ML) algorithms to learn one or more first user behavior patterns, each first user behavior pattern indicating a pattern of behavior of the user in conducting, at least, prior virtual resource exchange events;
in response to receiving data associated with the virtual resource exchange event being initiated by the virtual object, implementing ML techniques to apply the one or more first user behavior patterns to the data associated with the virtual resource exchange event to determine whether the virtual resource exchange event is authentic; and
in response to (i) the distributed trust computing network validating the NFT, and (ii) determining that the virtual resource exchange event is authentic, authorizing processing of the virtual resource exchange event.

12. The computer-implemented method of claim 11, further comprising:
generating a virtual object authentication token that associates the user with a virtual object identifier that identifies the virtual object used by the user; and
receiving or accessing the virtual object authentication token to authenticate the virtual object,
wherein authorizing processing of the virtual resource exchange event is in further response to (iii) authenticating the virtual object.

13. The computer-implemented method of claim 11, wherein implementing the one or more Machine Learning (ML) algorithms to learn the one or more first user behavior patterns, further comprises implementing the one or more Machine Learning (ML) algorithms to learn the one or more first user behavior patterns, wherein the first user behavior patterns are based on at least one of (i) one or more metaverses at which the user conducted the prior virtual resource exchange events, (ii) one or more virtual resource exchange providers at which the user conducted the prior virtual resource exchange events, (iii) a type of item or service obtained by the user in the prior virtual resource exchange events, (iv) an amount of resources exchanged by the user in the prior virtual resource exchange events and (v) geographic-location of the user when conducting the prior virtual resource exchange events.

14. The computer-implemented method of claim 11, wherein implementing the one or more ML algorithms to learn one or more first user behavior patterns further comprises implementing the one or more ML algorithms to learn one or more first user behavior patterns, each first user behavior pattern indicating a pattern of behavior of the user in conducting, at least one of, the prior virtual resource exchange events and prior non-virtual resource exchange events, wherein non-virtual resource exchange events include physical location resource exchange events and online resource exchange events.

15. The computer-implemented method of claim 11, further comprising:
implementing one or more Machine Learning (ML) algorithms to learn one or more second user behavior patterns, each second user behavior pattern indicating a pattern of behavior of the user in conducting prior non-virtual resource exchange events,
wherein implementing the Machine Learning (ML) techniques to apply the one or more first user behavior patterns further comprises implementing the Machine Learning (ML) techniques to apply the one or more first user behavior patterns and the one or more second user behavior patterns to the data associated with the virtual resource exchange event to determine whether the virtual resource exchange event is authentic.

16. A computer program product comprising:
a non-transitory computer-readable medium comprising:
a first set of codes for causing a computer to, in response to a virtual object associated with a user initiating the virtual resource exchange event, receive, at a distributed trust network, a Non-Fungible Token (NFT) associated with the user;
a second set of codes for causing a computer to validate, by a plurality of decentralized nodes of the distributed trust computing network, the NFT, wherein validating the NFT serves to authenticate the user;
a third set of codes for causing a computer to, in response to validating the NFT, store a data block associated with virtual resource exchange event within a distributed ledger of the distributed trust computing network;
a fourth set of codes for causing a computer to implement one or more Machine Learning (ML) algorithms to learn one or more first user behavior patterns, each first user behavior pattern indicating a pattern of behavior of the user in conducting, at least, prior virtual resource exchange events;
a fifth set of codes for causing a computer to, in response to receiving data associated with the virtual resource exchange event being initiated by the virtual object, implement ML techniques to apply the one or more first user behavior patterns to the data associated with the virtual resource exchange event to determine whether the virtual resource exchange event is authentic; and
a sixth set of codes for causing a computer to, in response to (i) the distributed trust computing network validating the NFT, and (ii) determining that the virtual resource exchange event is authentic, authorizing processing of the virtual resource exchange event.

17. The computer program product of claim 16, wherein the sets of codes further comprise:
a seventh set of codes for causing a computer to generate a virtual object authentication token that associates the user with a virtual object identifier that identifies the virtual object used by the user; and
an eight set of codes for causing a computer to receive or access the virtual object authentication token to authenticate the virtual object,
wherein the sixth set of codes is further configured to cause the computer to authorizing processing of the virtual resource exchange event in further response to (iii) authenticating the virtual object.

18. The computer program product of claim 16, wherein the fourth set of codes is further configured to cause the computer to implement the one or more Machine Learning (ML) algorithms to learn the one or more first user behavior patterns, wherein the first user behavior patterns are based on at least one of (i) one or more metaverses at which the user conducted the prior virtual resource exchange events, (ii) one or more virtual resource exchange providers at which the user conducted the prior virtual resource exchange events, (iii) a type of item or service obtained by the user in the prior virtual resource exchange events, (iv) an amount of resources exchanged by the user in the prior virtual resource exchange events and (v) geographic-location of the user when conducting the prior virtual resource exchange events.

19. The computer program product of claim 16, wherein the fourth set of codes is further configured to cause the computer to implement the one or more ML algorithms to learn one or more first user behavior patterns, each first user behavior pattern indicating a pattern of behavior of the user in conducting, at least one of, the prior virtual resource exchange events and prior non-virtual resource exchange events, wherein non-virtual resource exchange events include physical location resource exchange events and online resource exchange events.

20. The computer program product of claim 19, wherein sets of codes further comprise:

a seventh set of codes for causing a computer to implement one or more Machine Learning (ML) algorithms to learn one or more second user behavior patterns, each second user behavior pattern indicating a pattern of behavior of the user in conducting prior non-virtual resource exchange events, wherein the fifth set of codes is further configured to cause the computer to implement the Machine Learning (ML) techniques to apply the one or more first user behavior patterns further comprises implementing the Machine Learning (ML) techniques to apply the one or more first user behavior patterns and the one or more second user behavior patterns to the data associated with the virtual resource exchange event to determine whether the virtual resource exchange event is authentic.

\* \* \* \* \*